Dec. 3, 1963 J. F. GREENAWAY ETAL 3,113,182

REGISTER TRANSLATORS FOR USE IN AUTOMATIC TELEPHONE SWITCHING SYSTEMS

Filed Jan. 21, 1959 10 Sheets-Sheet 1

Dec. 3, 1963 J. F. GREENAWAY ETAL 3,113,182

REGISTER TRANSLATORS FOR USE IN AUTOMATIC TELEPHONE SWITCHING SYSTEMS

Filed Jan. 21, 1959 10 Sheets-Sheet 4

| | | | | | |
|---|---|---|---|---|---|
| SL1 | 1111111111 | 3333333333 | 5555555555 | 7777777777 | 9999999999 |
| SL2 | 2222222222 | 4444444444 | 6666666666 | 8888888888 | 0000000000 |
| SL3 | 1234567890 | 1234567890 | 1234567890 | 1234567890 | 1234567890 |

INVENTORS
JOHN FRANK GREENAWAY · DONALD HALTON ·
KENNETH GEORGE MARWING · WILLIAM ARCHIBALD
BY CHARLES HEMMINGS ·

Irwin S. Thompson
ATTORNEY

Dec. 3, 1963 J. F. GREENAWAY ETAL 3,113,182

REGISTER TRANSLATORS FOR USE IN AUTOMATIC TELEPHONE SWITCHING SYSTEMS

Filed Jan. 21, 1959 10 Sheets-Sheet 6

Dec. 3, 1963 J. F. GREENAWAY ETAL 3,113,182

REGISTER TRANSLATORS FOR USE IN AUTOMATIC TELEPHONE SWITCHING SYSTEMS

Filed Jan. 21, 1959 10 Sheets-Sheet 7

United States Patent Office 3,113,182

Patented Dec. 3, 1963

3,113,182

REGISTER TRANSLATORS FOR USE IN AUTOMATIC TELEPHONE SWITCHING SYSTEMS

John Frank Greenaway, Taplow, and Donald Halton, Kenneth George Marwing, and William Archibald Charles Hemmings, Liverpool, England, assignors to Automatic Telephone & Electric Company Limited, Liverpool, England, a company of Great Britain Filed Jan. 21, 1959, Ser. No. 788,188
Claims priority, application Great Britain Jan. 22, 1958
7 Claims. (Cl. 179—18)

Figure 1:
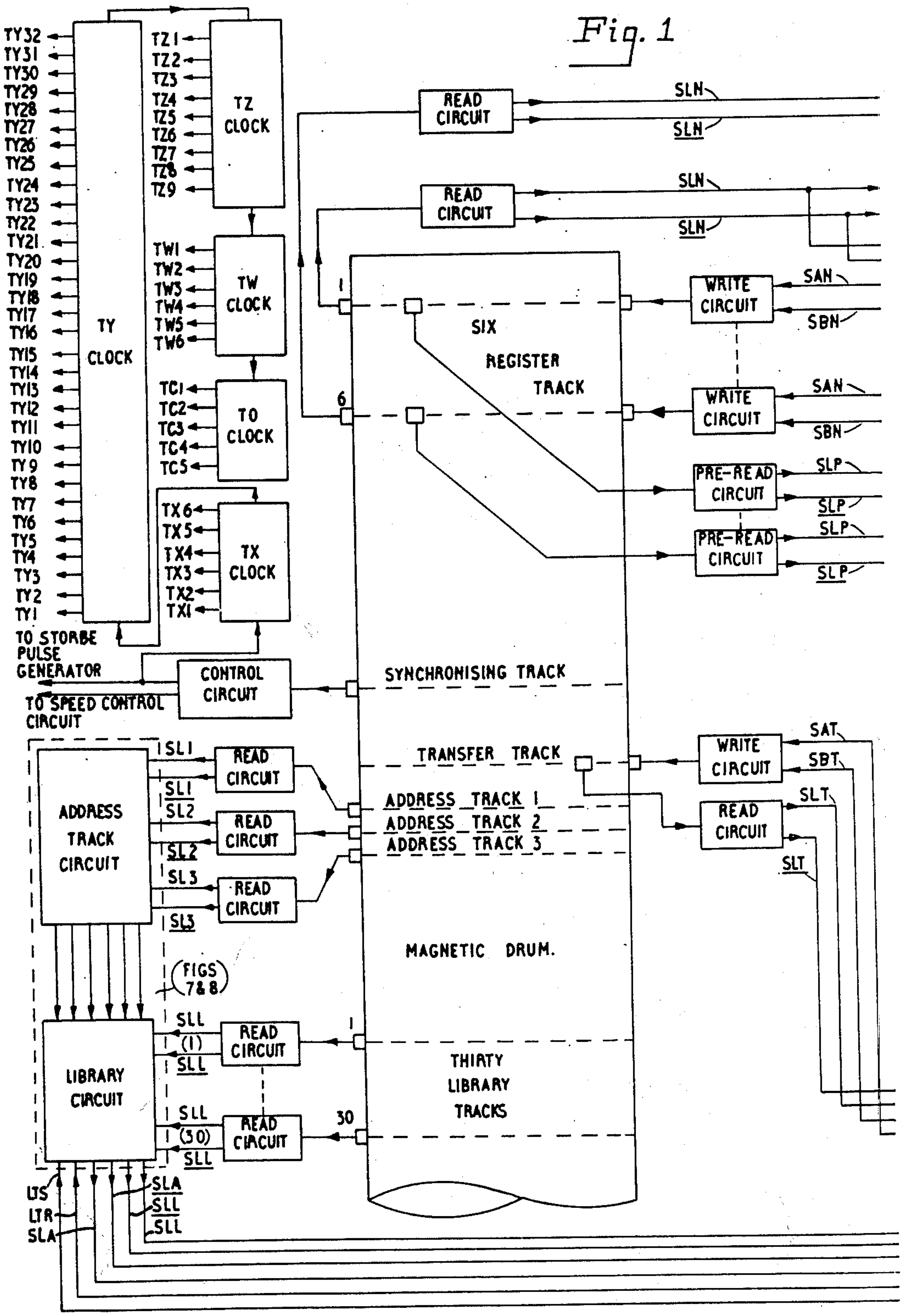

The present invention relates to register translators for use in automatic telephone switching systems, and is particularly concerned with such equipment which is of the magnetic drum type.

Proposals have already been made for translating exchange codes into routing codes by means of a magnetic drum translator, and such arrangements are satisfactory for cases in which all exchange codes employ the same number of digits, usually three. Difficulties arise, however, in very large networks where codes are used in which the number of digits is variable. In one previous proposal, it was necessary to wait until enough dialled digits had been received to ensure that the largest possible exchange code was registered, and it was also necessary to search for the required translation first among translations of codes using the largest number of digits, then among translations of shorter codes, the translations being arranged in a particular order. Since in a telephone system employing mixed numbering arrangements the majority of calls made would involve the smaller exchange codes, a delay is introduced in setting up such calls if it is necessary to wait until further digits have been dialled before translation is effected. It is an object of the invention to provide a register translator capable of dealing with exchange codes of different lengths which translates a code as soon as the last digit of the code has been registered, thereby reducing the time required to set up calls using the shorter exchange codes.

According to the invention, in a registering and translating device of the magnetic drum type provided with a plurality of register tracks for the registration of exchange codes consisting of different numbers of digits and also provided with a plurality of library tracks bearing permanent registrations representing translations of digits registered on a register track, when a predetermined number of digits have been registered on a register track, translated digits corresponding to said registered digits are obtained from a library track and arrangements are provided which are effective in the number of registered digits is greater than said predetermined number in adding a further registered digit to said translated digits and in obtaining further translated digits corresponding to the combination of the initial translated digits and the further registered digit.

According to a feature of the invention, in a registering and translating device of the magnetic drum type comprising a plurality of circumferentially-arranged register tracks on said drum each having a plurality of groups of storage blocks for the registration of exchange codes consisting of different numbers of digits, a plurality of circumferentially-arranged library tracks bearing permanent registrations representing translations of said code digits, means responsive when a predetermined number of said code digits have been registered on a register track for obtaining from a library track translated digits corresponding to said registered code digits, means responsive when the number of code digits registered on said register track is greater than said predetermined number for adding the next occurring digit to said translated digits and means for obtaining from a library track further translated digits corresponding to said translated digits and said next occurring code digit.

According to another feature of the invention, in a registering and translating device of the magnetic drum type provided with a plurality of register tracks for the registration of exchange codes consisting of different numbers of digits and also provided with a plurality of library tracks bearing permanent registrations representing translations of registered digits, when a predetermined number of digits have been registered on a registered track, translated digits corresponding to said registered digits are obtained from a library track, and means are provided for determining in accordance with the translated digits whether the exchange code contains said predetermined number of digits or a greater number of digits, said means in the latter case enabling the next occurring registered digit to be added to said translated digits whereupon further translated digits are obtained corresponding to the combination of the initial translated digits and said further registered digit, the operation being repeated until final translated digits as determined by said means are obtained.

In some previous register translators of this type, translations of exchange codes have been located at various addresses round the drum, an address being defined by two of the exchange code digits, and a third code digit being used to select a track on which the required translation is to be found. For reasons connected with the physical size of the drum and the spacing of magnetic markings, it may not be possible to store the 100 translations required by the possible combinations of two digits of a code on the same track, so that they may have to be distributed over two tracks. In this case, the track on which the translation is located requires two code digits for its selection. Similarly the addresses for the 100 translations would also be distributed over two address tracks. Such an arrangement would be satisfactory where all codes contain the same number of digits, but in mixed numbering arrangements the digits of the code which are used for selecting the address are not always in the same position in the code, and this would involve the use of a separate pair of address tracks having addresses arranged in the appropriate manner for each type of exchange code. For example, if the system allowed for 3-digit, 4-digit and 5-digit exchange codes, three pairs of address tracks would be required for selecting the three different types of address. This extravagant use of tracks is undesirable in the interests of the economy of cost and size of equipment, and it is a further object of the invention to reduce the number of address tracks required to cater for a system employing mixed numbering.

According to a further feature of the invention, in a registering and translating device of the magnetic drum type provided with a plurality of register tracks having storage blocks for the registration of code digits and also provided with a plurality of library tracks bearing permanent registrations representing translations of the code digits in which the library tracks are arranged in pairs, selection of a pair of tracks being effected in accordance with the first code digit while selection of one track of the selected pair is effected in accordance with the odd or even value of the second code digit and a plurality of address tracks are provided bearing permanent registrations representing all possible values of the second and third code digits, selection between two of which address tracks is effected in accordance with the odd or even value of said second code digit, means being provided for comparing the second and third code digits registered in said storage blocks on a register track with the permanent registrations on the selected one of said two address tracks and on a third of said address tracks and on coincidence being attained for transferring the corresponding translation from the selected library track to other storage blocks of said register track.

According to yet another feature of the invention, in a registering and translating device of the magnetic drum type comprising a plurality of circumferentially-arranged register tracks on said drum each having a plurality of groups of storage blocks for the registration of code digits, first, second and third circumferentially-arranged address tracks on said drum, one of said first and second address tracks bearing permanent registrations representing all odd digits, the other of said first and second address tracks bearing permanent registrations representing all even digits and the third bearing permanent registration representing all digit values, a plurality of circumferentially-arranged library tracks arranged in pairs and bearing permanent registrations representing translations of said code digits, means for selecting a pair of library tracks in accordance with the value of one of said code digits, means for selecting one library track of the selected pair and for selecting said first or said second address track in accordance with the odd or even value of a second of said code digits, means for comparing the second and third code digits registered in said storage blocks on a register track with the permanent registrations on the selected one of said first and second address tracks and on said third address track and means responsive to coincidence being attained in said comparing means for transferring the corresponding translation from the selected library track to other storage blocks on said register track.

An advantage of the magnetic drum type of register translator is that a single equipment can deal with a very large number of subscribers' lines and exchange junctions, and in some cases only one such equipment, with a standby, can deal with all calls outgoing from an exchange. It is therefore essential that a fault occurring on the equipment can be detected very rapidly, and control of outgoing calls transferred to the standby equipment. For this purpose routine testing equipment is employed which cyclically tests all the functions of the magnetic drum equipment by providing artificial traffic. It is a further object of the invention to provide improved routine testing equipment which has a short cyclic testing period and which makes a minimum of the drum capacity inaccessible to normal calls.

The various features of the invention will appear in the following description of one embodiment, which is a register translator catering for 3-, 4- and 5-digit codes, and which provides comprehensive routine testing arrangements. The description should be read in conjunction with the accompanying drawings comprising FIGS. 1–12.

Figure 2:
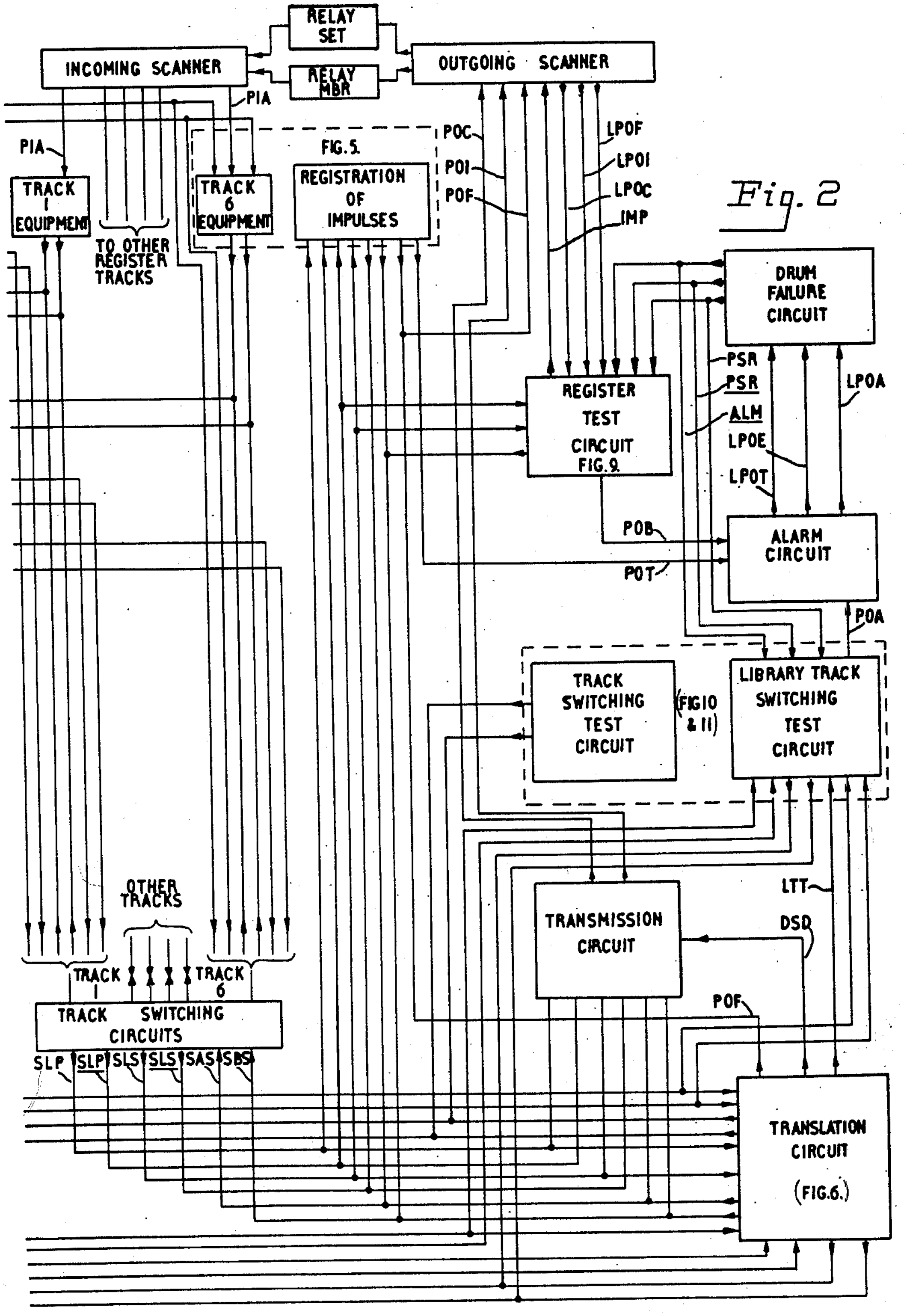
Figure 9:
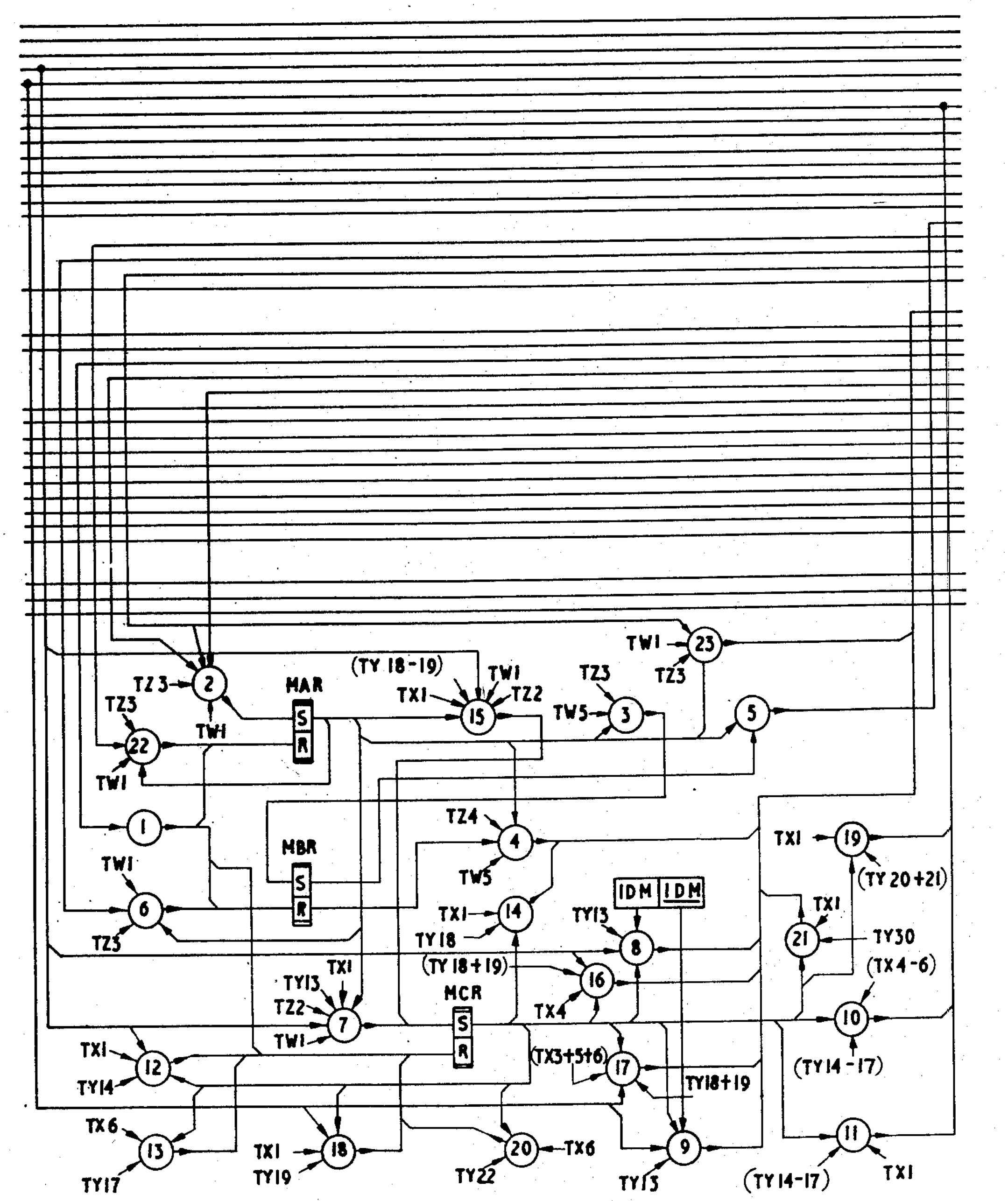
Figure 3:
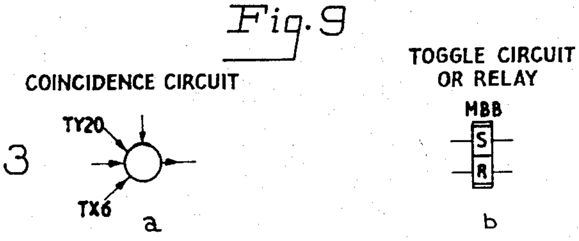
Figure 4:
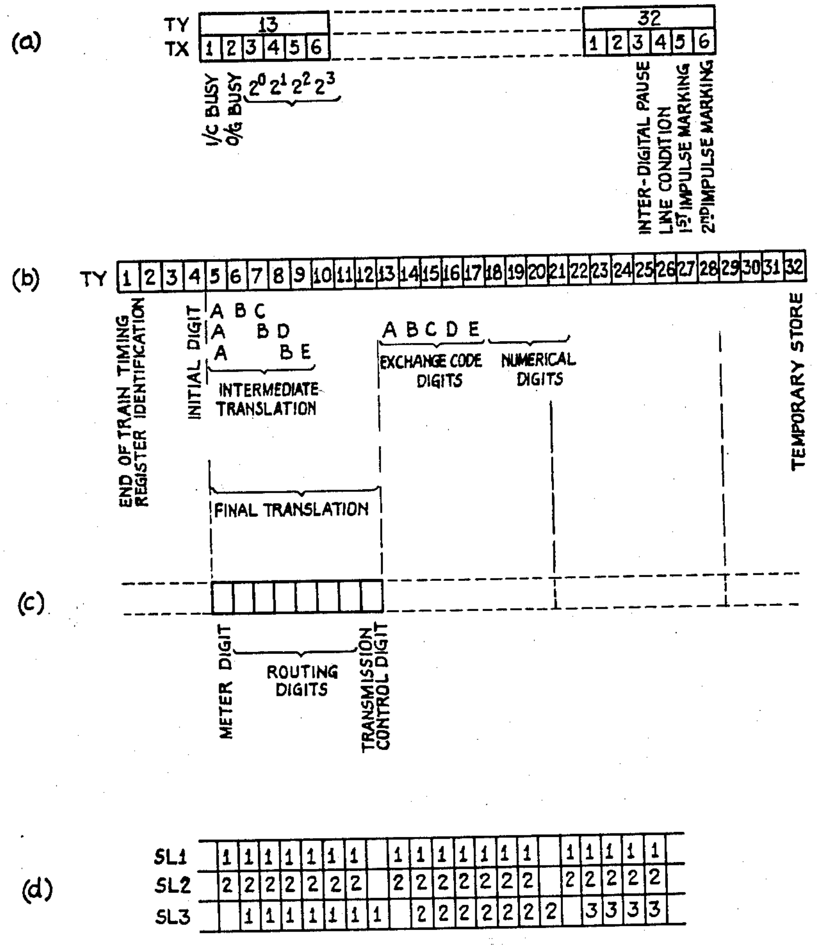
Figure 5:
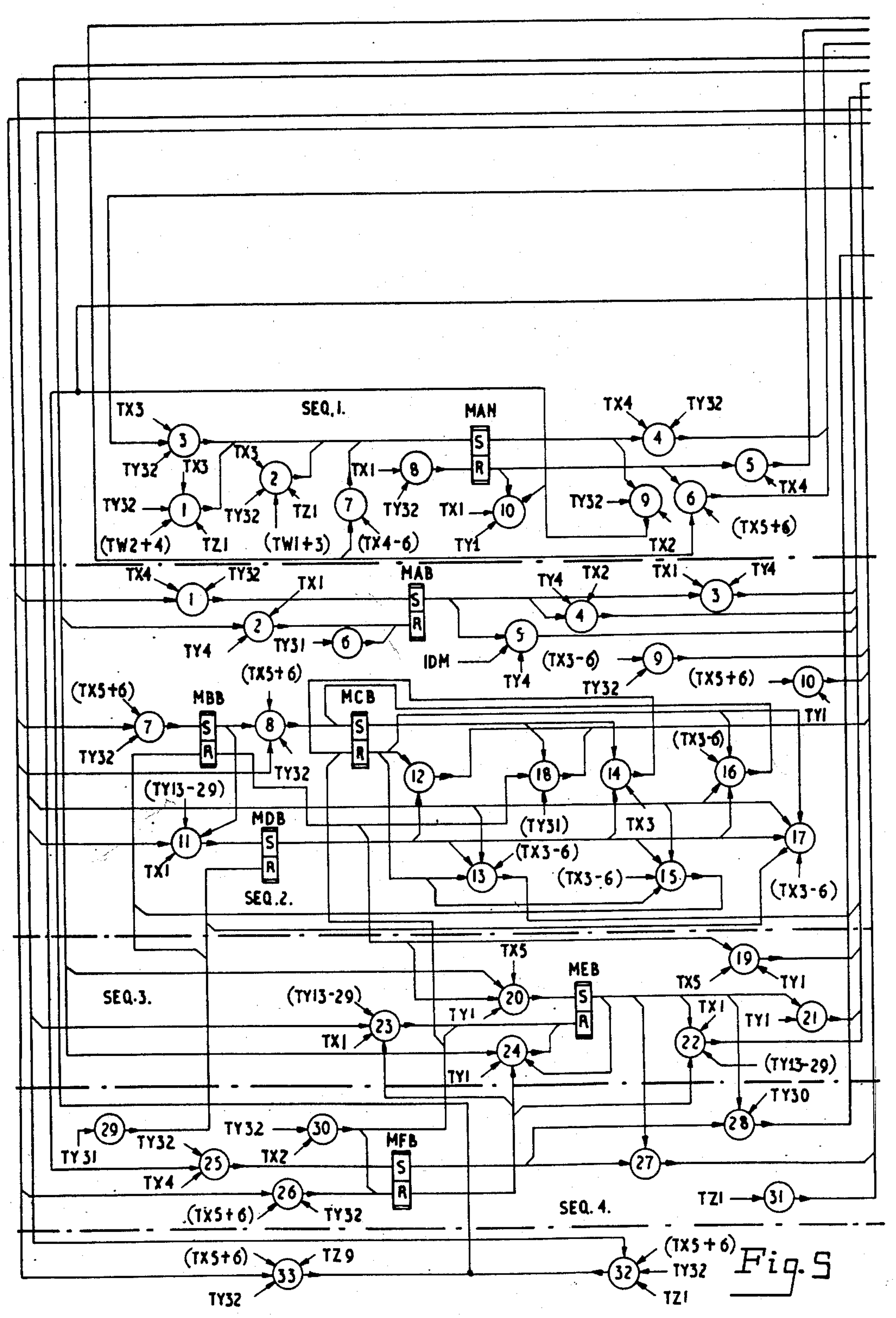
Figure 6:
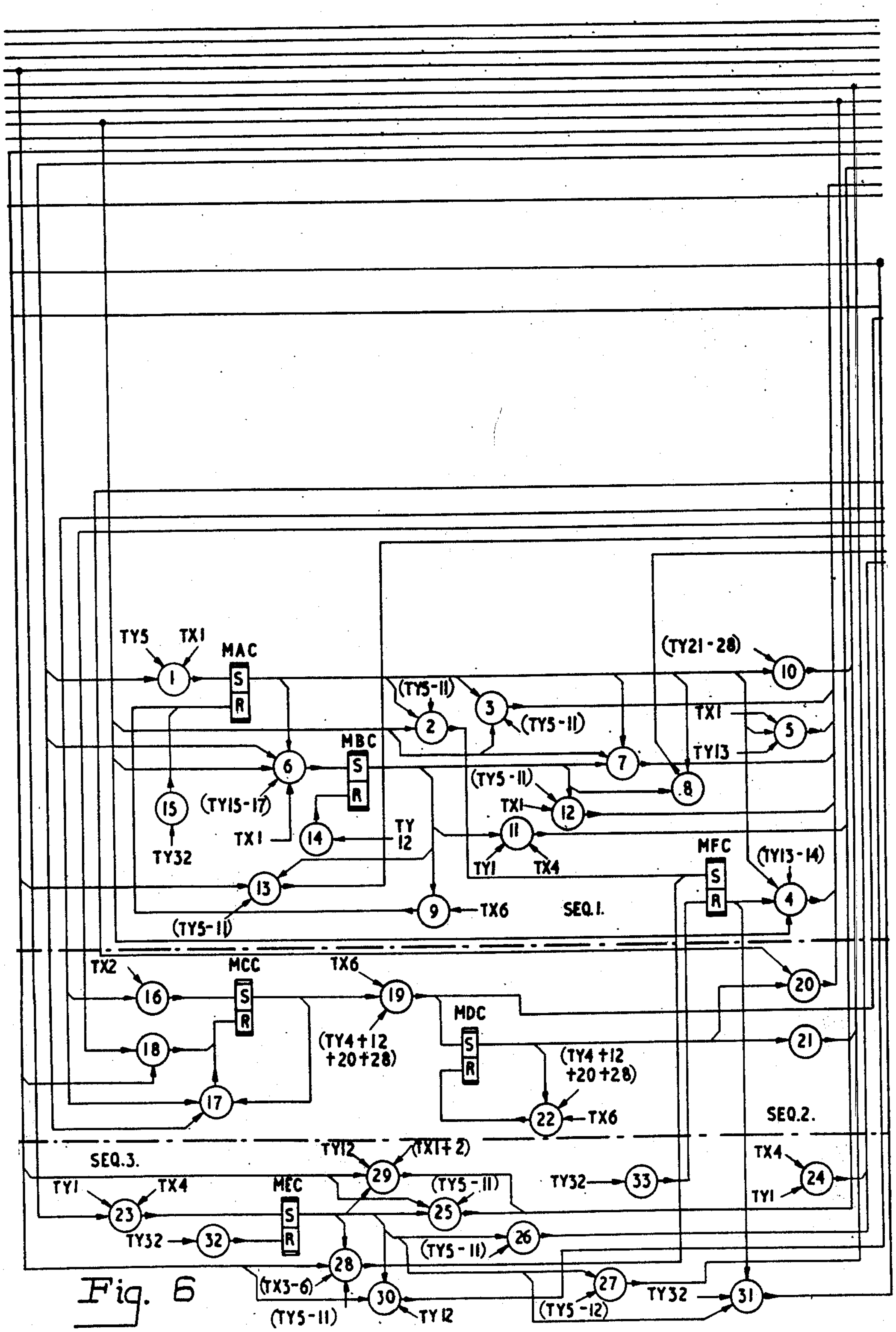
Figure 7:
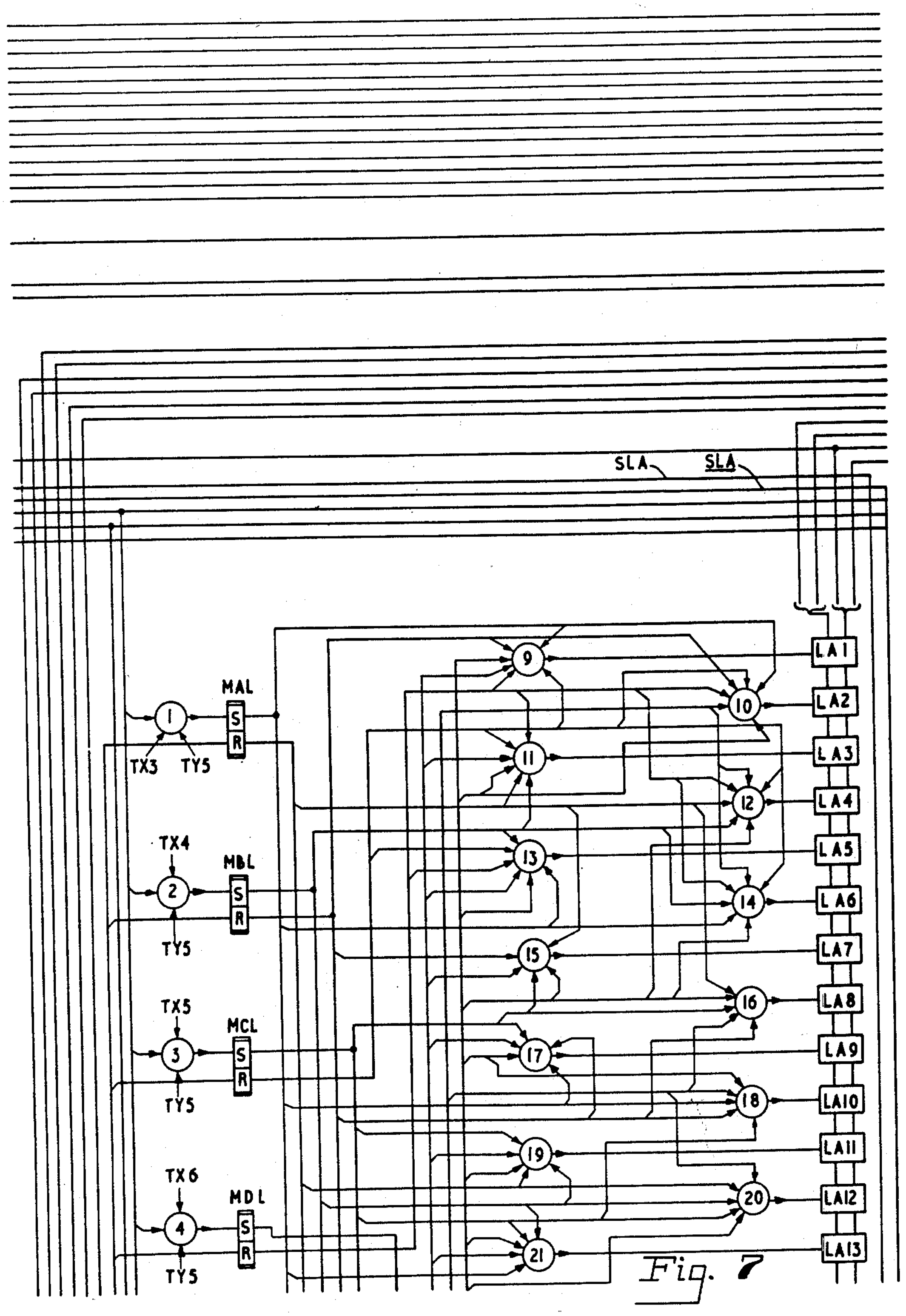
Figure 8:
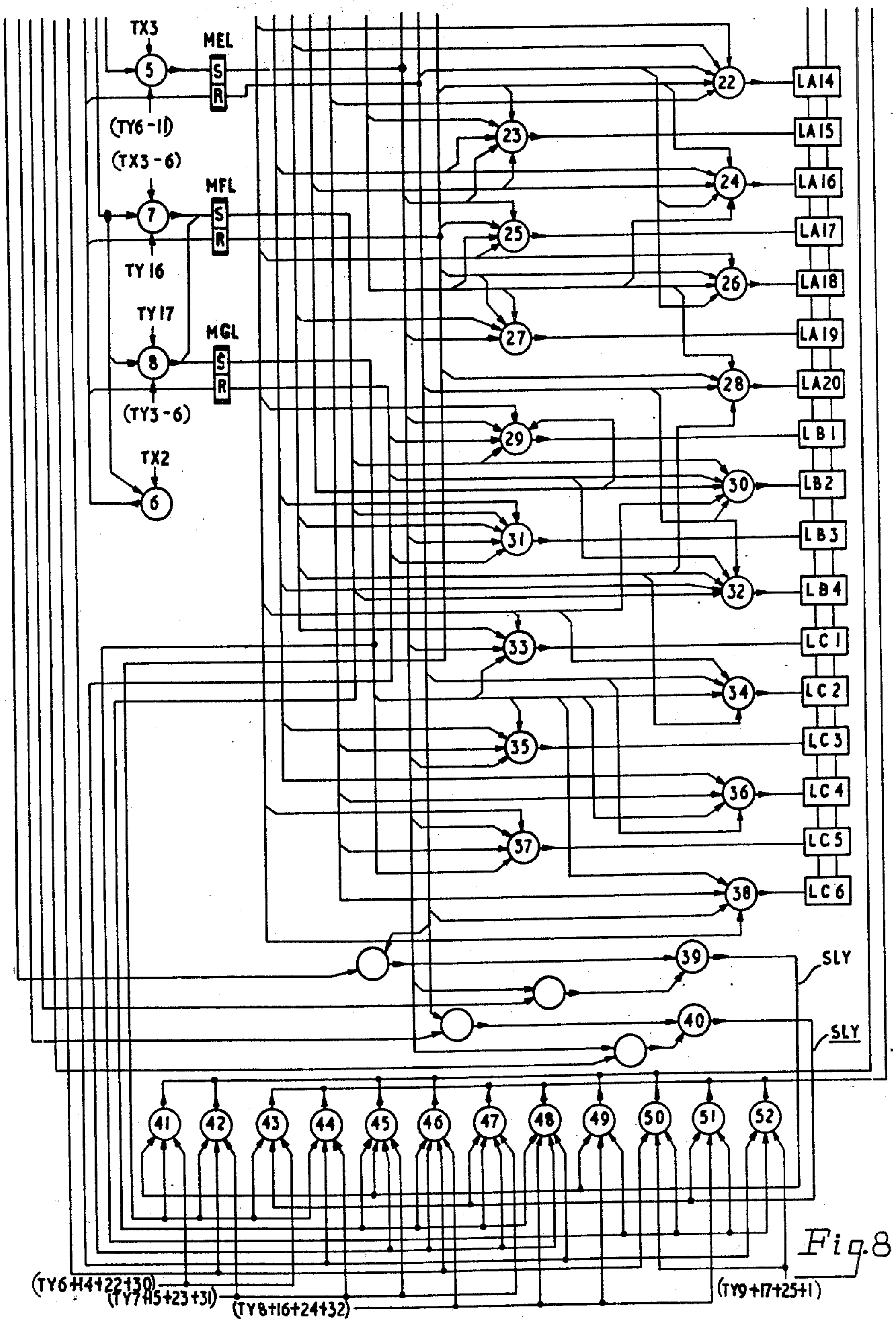
Figures 10, 12:
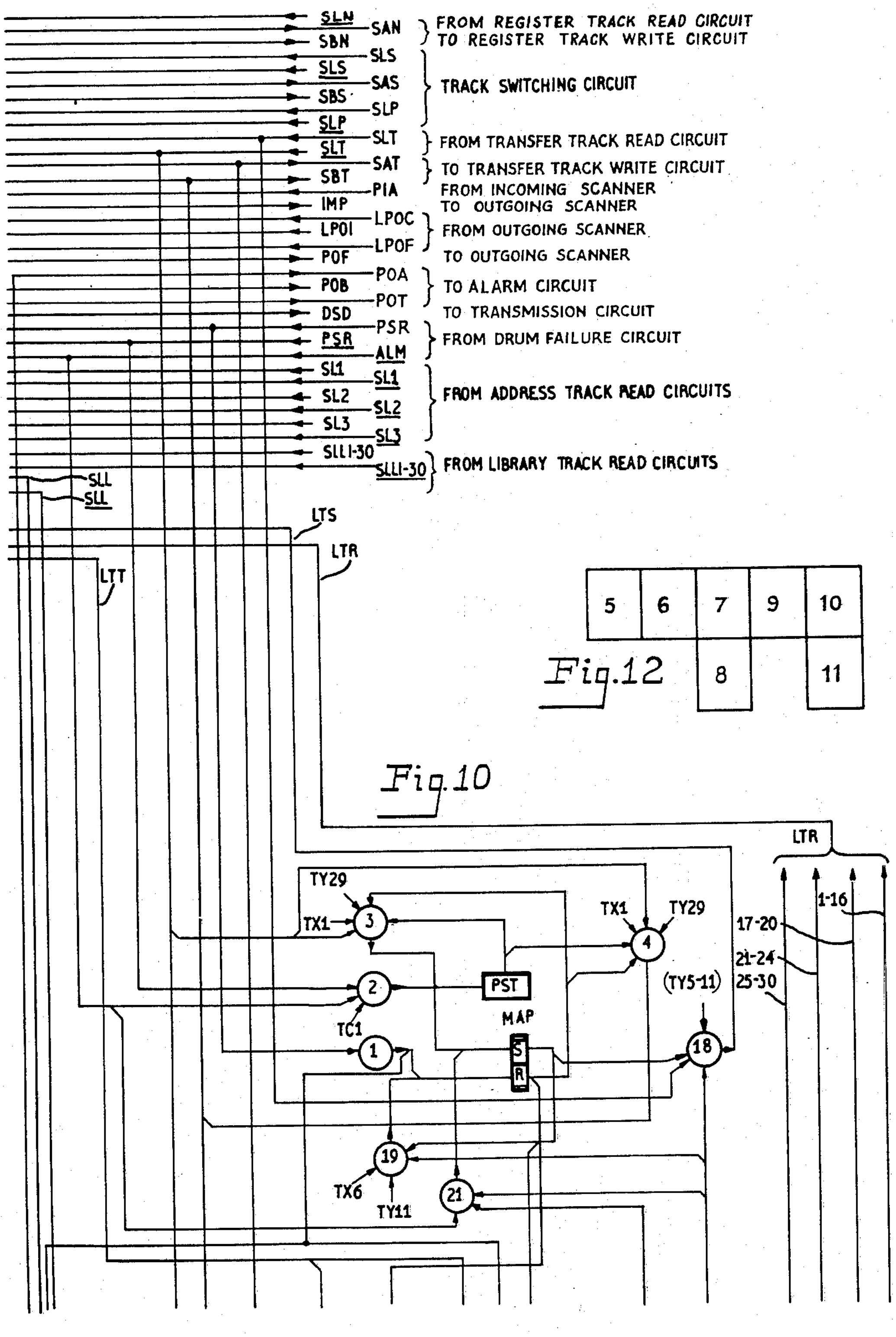
Figure 11:
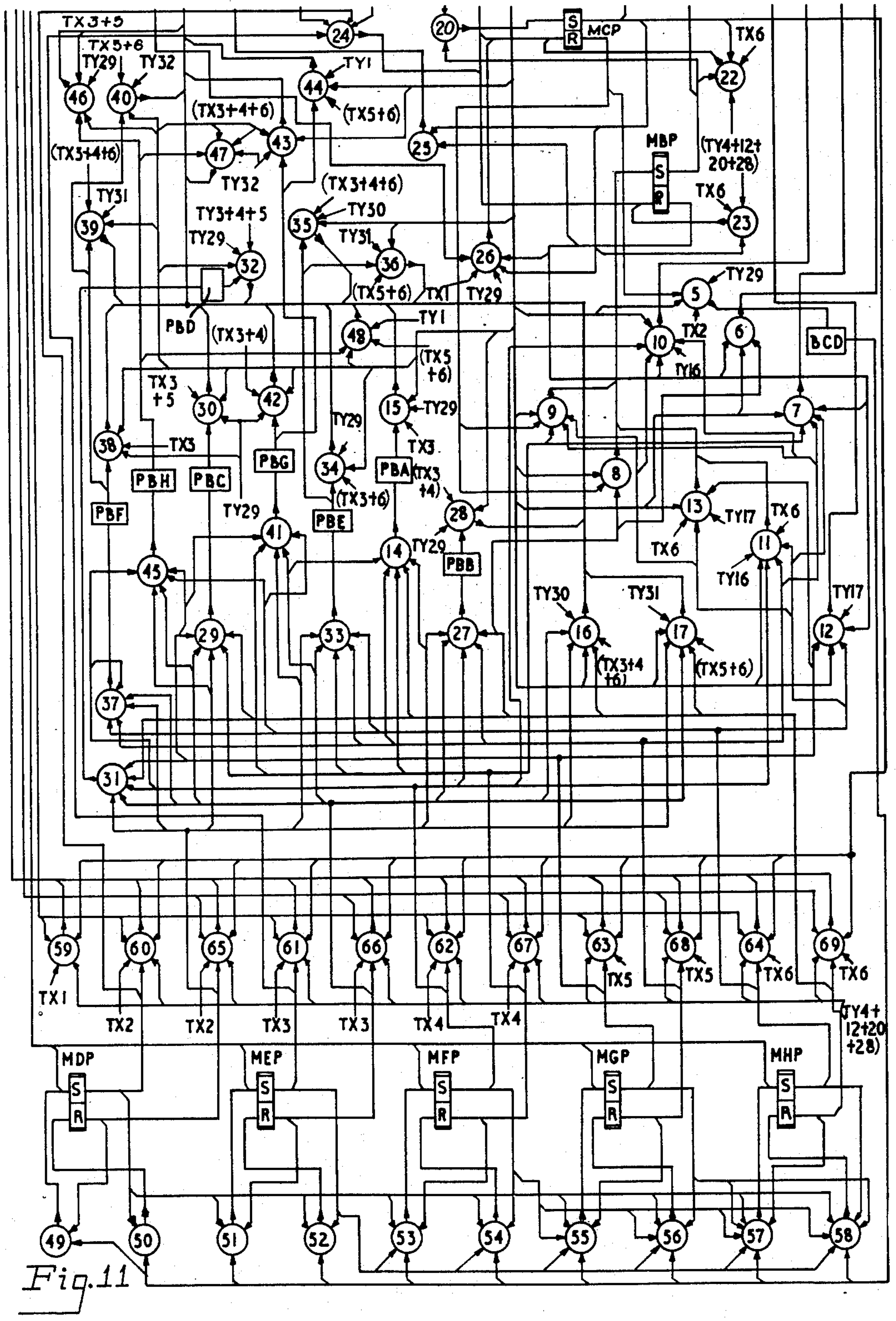

Of the drawings:

FIGS. 1 and 2 together show a block diagram of the magnetic drum and its associated equipment, FIG. 3 shows symbols employed in the circuit drawings, FIG. 4 show details of tracks on the magnetic drum, FIG. 5 shows the circuit used in the registration of dialled impulses, FIG. 6 shows the circuit used in translating a dialled code, FIGS 7 and 8 show the library track switching circuits and the address track switching circuits, FIG. 9 shows the register checking circuit, FIGS. 10 and 11 show the checking circuit for the library track switching circuits, and FIG. 12 shows the manner in which FIGS. 5–11 should be arranged to form a complete circuit.

The magnetic drum used in the described embodiment is of the type described in United States application Serial No. 778,147 filed December 4, 1958, in the name of G. T. Baker and assigned to British Telecommunications Research Limited, in which patent the method of storing information in binary form by reversals of magnetisation is also described. The method of translation employing the magnetic drum is described in U.S. Patent No. 3,055,983 of September 25, 1962. It is therefore only necessary to describe here how tracks and sections of tracks on the surface of the drum are allocated in the present case, and how, access is gained to the various parts of the drum surface when information is to be stored, modified or extracted.

In the embodiment of the invention to be described, and as shown diagrammatically in FIGS. 1 and 2, each drum includes, among others, six regenerative register tracks each divided into nine sections, eight of which are employed as registers. There are 30 non-regenerative library tracks, containing routing and metering codes permanently stored in blocks corresponding to similarly positioned address blocks on a set of non-regenerative address tracks, each of the address blocks having permanently stored in it part of an exchange code. The routing and metering information stored in the library tracks refers to the exchange code, of which part is contained in the corresponding position of the address track. A further track known as the "transfer track" is provided, upon which dialled codes extracted from a register are circulated until a position corresponding to an address containing part of the dialled code is reached, when the appropriate routing code read from the corresponding section of a selected library track is substituted for the dialled code. The routing code is then circulated on the transfer track until a position corresponding to the originating register is reached, when transfer of this code to the register is effected.

Access to particular storage areas is obtained by means of a system of square-wave clock pulses, provided by a pulse generator driven from a specially marked track on the drum, and therefore synchronised with it. The duration of pulses is based upon the revolution period of the drum, and the pulses are related as follows:

TW pulses have a duration equal to the time taken for the drum to make one electrical revolution. How this differs from the mechanical revolution will be explained subsequently.

TZ pulses are synchronized with TW pulses, and nine TZ pulses have the same duration as one TW pulse.

TY pulses are similarly related to TZ pulses, 32 TY pulses having the same duration as one TZ pulse.

TX pulses are so related to TY pulses that six TX pulses occur during one TY pulse.

All the pulses in a series are contiguous, and the commencement of a pulse of any series coincides with the commencement of a pulse in the series of next higher frequency.

The duration of a single TX pulse is used to define the length of track to be occupied by a single storage element containing one binary digit, this length of track passing completely under a read or write head during one TX pulse. TY pulses are used to define the length of track occupied by a block of six elemental areas, and when such a block is used as a digit store, a digit representing nought to ten in binary form, together with two controlling binary digits, may be stored therein. Other uses are made of certain of these blocks in controlling and manipulating digital information. TZ pulses define the length of track occupied by a register, which contains 32 storage blocks TY. TW pulses are used to define the length of track occupied by all the registers on a single track.

The pulses in each series are distributed over a set of leads in a recurring cycle, there being six TW leads, nine TZ leads, 32 TY leads and six TX leads. By combining a lead from each of these series in an "and" type of coincidence circuit, it is possible to obtain a single output pulse of duration equal to a TX pulse, at any required point in the complete cycle of TW pulses. Since the position of a register on a track of the drum is determined by the timing cycle rather than the revolution period of the drum, such coincidence circuits may be used to define the passage of a particular elemental area in a register under a reading or writing head. It is therefore convenient to designate each storage position on a track by the timing pulse occurring as that particular position is scanned, e.g.

TX2.TY21.TZ5

It is sometimes necessary for a timing pulse to continue for more than one TX period, and combined timing leads may conveniently be used to reduce the number of coincidence circuits required. Where a timing lead has an output covering more than one timing period, a "+" sign is used, e.g. (TX5+6), or a "—" sign, e.g. (TY5—11).

The coincidence circuits are represented in the drawings by symbols of which *a* in FIG. 3 is typical. A description of the coincidence circuits employed is given in A.T.E. Journal, volume 13, No. 1, January 1957, pages 42–54. The timing pulse leads TX6 and TY20 comprise two of the inputs to the circuit and the other two inputs may be, for example, connected to the output circuits of two relays or of reading heads. The arrows indicate the direction of the signal between circuit elements. The number inside the circle is a reference number for the coincidence circuit, these numbers indicating the order in which the circuits become effective. The numbers are also shown against the corresponding circuits in the text.

Pulses from these coincidence circuits may be used to operate relays, all of which are electronic in nature and are of the bistable type. In the set condition a relay gives an operative output on one output lead, and in the reset condition gives an operative output on a second output lead. The relays may also be operated by other similar relays.

The symbol for a relay used in the drawings is shown by the example at *b* in FIG. 3. The relay, which takes the form of a bistable toggle circuit is also described in the previously mentioned article in A.T.E. Journal. The "set" and "reset" halves of the relays are referenced "S" and "R" respectively in the drawings. In each case, it is assumed that the input signals to a relay come from the left-hand side, while the output signals are taken from the right-hand side of the relay.

It should be explained that the positioning of the set input and set output in alignment on opposite sides of the relay symbol does not indicate that there is a D.C. connection between these two leads but merely that, if the relay is in the reset condition and a pulse is applied to the set input, then an output signal will be obtained on the set output, i.e. the relay is set or operated. Similar considerations also apply to the reset input and reset output.

In the use of the relay in the present invention, conditions may arise where the reset output of a relay is not required, that is to say the effective control is exerted by the relay when it is operated from the reset to the set condition and no control is exerted by the relay when operated from the set to the reset condition. In such cases the reset output is omitted from the symbol. It will, however, be understood that the reset input must always be present because of the necessity of returning the relay to the reset condition after the control has been exerted in the set condition so that the relay can be again set at a later time.

The outputs of relays and of coincidence circuits are also used to record information on the tracks of the drum and for this purpose so-called "A" and "B" leads are employed. A "write" signal applied to an "A" lead results in a magnetic marking representing "0" being written or re-written on a track and a "write" signal applied to a "B" lead results in a magnetic marking representing "1" being written or re-written on the track. If "write" signals are applied to both leads simultaneously, the effect of the "B" lead predominates and a 1 is written on the track.

In order to make the writing and switching operations definite, very short strobe pulses are employed, which occur at a point towards the end of each TX pulse. The strobe pulses are ineffective on their own, but when they coincide with a relay-operating pulse or a writing pulse, the two pulses together effect the circuit operation. It was mentioned that a relay has two output conditions, dependent on the set or reset condition of the relay. These may be indicated when describing circuit operations in symbolic form by using the relay designation alone to refer to the set condition, e.g. MAB, and by using the relay designation underlined to refer to the reset condition, e.g. $\underline{\text{MAB}}$. Thus a circuit operation in which a relay MAC is reset when the last storage block of a register is passing the read head may be written:

TY32—$\underline{\text{MAC}}$ showing that in the time period represented by the timing pulse TY32, a signal is applied to relay MAC to reset it, whether it was previously set or not. If this relay is to be set during another part of the register scan, but only if a second relay MBC is already in the set condition, the circuit operation may be written:

MBC.TX6.TY15—MAC

This circuit, of course, would be inoperative if relay MBC were in the reset condition, and at any other instant than during the passage of element TX6.TY15 under the read head. It should be noted that this operation is not dependent upon the signal stored in element TX6.TY15 of the register. This symbolic form of describing circuit operations is described in detail in the Post Office Electrical Engineers Journal, volume 51, Part 2, July 1958, pages 137 to 144 and also in A.T.E. Journal volume 12, No. 4, October 1956, pages 271–280.

The various tracks have characteristic letters allotted to them as follows:

Register tracks—S
Transfer track—T
Address tracks—A
Library tracks—L

Signals apeparing on signal leads connected to the read and write heads are referenced by using a three-letter combination, the first letter being "S" and the last the track reference letter. If the last letter is "S," this indicates that the leads extend from common equipments and can be switched to the heads of the six register tracks, and this also applies to the leads from the address and library tracks. In the case of write heads, the second letter is "A" when a 0 is to be written on the track and "B" when a 1 is to be written in accordance with the "A" and "B" signals mentioned previously.

A signal read from the track has "L" for its second letter, and the difference between a 1 and a 0 is indicated by underlining the combination in the case of a 0 signal. By way of example, the circuit written $\underline{\text{MBB}}$.SLS.TX5.TY1—MEB indicates that if relay MBB is in the reset condition, and a 1 signal is read at any of the nine storage positions TX5.TY1 of the register track being scanned, a signal is applied to relay MEB to set it.

Each register is accessible to a relay set through so called "incoming scanning" equipment, by means of which relay sets are associated in turn with the drum in a continuous scanning operation. The register tracks are continuously in use for scanning purposes, so that a register is associated with its relay set for the transfer of information once in each electrical revolution of the drum. The speed of rotation of the drum of the embodiment of the invention being described is 2160 revolutions per minute and a revolution therefore takes 27.75 milliseconds (ms.). Only part of the circumference of the drum is used for a regenerative track, the spacing between reading and writing heads being such as to give a scanning period of 16⅔ ms. for each regenerative track. Since a relay set is sampled each 16⅔ ms., any change of condition in the relay set due to dialling will be recorded by the register, if the dialling speed does not greatly exceed the normal ten impulses per second.

The allocation of storage areas within a section of track used as a register will be seen from FIG. 4. From this drawing it will be seen that the dialled digits are allotted the storage blocks TY13—21. When a register has been seized by a calling subscriber via the relay set, a so-called "initial digit," which when transmitted steps the first routing selector to the appropriate level, is artificially generated and is stored in block TY4. The remaining code digits are stored in blocks TY13—17, or in as many of these as are required. The numerical digits are stored adjacent the last code digit, the numerical digit storage blocks extending to block TY21. The routing digits, and the other translation information obtained by translation of the exchange code digits are stored in blocks TY5—12.

It will be seen by reference to diagram (*a*) of FIG. 4, which shows the layout of a typical digit storage block TY13, that in each digit storage block, storage elements TX3—6 are used to register the digit in binary form, element TX3 being the lowest order element ($2^0$) and TX6 being the highest order element ($2^3$) in each case. The element TX1 of a storage block is referenced "i/c busy," i.e. "incoming busy," and the marking in this element is indicative of whether the particular storage block has a digit stored in it or has no digit or an incomplete digit stored in it. In these blocks, elements TX2 are referenced "o/g busy," i.e. "outgoing busy," and the marking in one of these elements is indicative of whether or not a digit stored in that particular storage block is to be transmitted from the register.

The layout of the temporary digit storage block TY32 is also shown in diagram (*a*) of FIG. 4, and this will be described in connection with the registration of dialled impulses later in the description. Diagram (*c*) of FIG. 4 shows the transfer track and the allocation of storage blocks on it to the translation information. It will be apparent that, being only eight TY blocks long, this track moves relative to the register tracks in steps of eight blocks and is repeated at positions TY13—20, TY21—28, TY29—4 and TY5—12 successively.

In the description which follows, each of the various functions of the equipment will be described as a series of sequences and the drawings are arranged so that the sequences in one function appear in succession from top to bottom of the drawing, while the information read from and written on to the drum is shown, in general, as passing from left to right in each sequence. The sequences are referenced SEQ.1, SEQ.2 and so on in the drawings.

*Registration of Dialled Impulses*

Scanning equipment is provided individual to each register track which enables an impulsing lead from each relay set associated with a register on that track to be connected to the writing head of the track once during each scan of the register on the track. The scan of registers associated with any one register track recurs every 16⅔ ms. Dialled impulses, which are regenerated by the relay set, are detected by the individual register track equipment, and markings corresponding to these impulses are allocated to temporary storage positions in the appropriate register. These markings are detected by scanning equipment which is common to all the register tracks, and are thereby transferred to the appropriate digit storage blocks in their respective registers. This transfer is affected for each track in turn and since six register tracks are used, the common scanning equipment examines each register once in every 100 ms.

The circuit will be described with reference to FIG. 5.

*Sequence 1: (Individual track equipment).*—Sampling signal lead from relay set via incoming scanning circuit, detection of dialled impulse, storage of impulse in temporary store.

A relay MAN is set by a signal indicating that the subscriber's line is looped and the set condition of relay MAN is used to record the looping of the subscriber's line as a marking in the register. It is therefore convenient to use relay MAN to write on the track markings representing artificial impulses, which may later be detected, and which serve to check that the individual track equipment on each track, including the reading and writing heads, is functioning correctly. These test markings are made on part of the register track which is not used to provide a register section accessible to a subscriber, viz., the section corresponding to the timing pulse TZ1. Two circuits are employed for setting relay MAN during the scan of this track section, twice in each 100 ms. period. The first of these circuits is operative during the scan by the common equipment of tracks TW2 and TW4 and the second during the scan by the common equipment of tracks TW1 and TW3. The first of these circuits set the relay MAN associated with odd-numbered register tracks and the second sets the relay MAN associated with even-numbered register tracks. Relay MAN is set during the scan of element TX3.TY32 of track sections TZ1 by the circuits:

$$\text{TX3.TY32.TZ1.(TW2+4)}-\text{MAN} \quad (1)$$

and $$\text{TX3.TY32.TZ1.(TW1+3)}-\text{MAN} \quad (2)$$

During the scan of a working register, relay MAN is set during the scan of element TX3.TY32 only if the subscriber's line is looped, in which case a signal PIA is detected on the impulsing lead from the relay set. The circuit for setting relay MAN in this condition is:

$$\text{PIA.TX3.TY32}-\text{MAN} \quad (3)$$

The set condition of relay MAN causes a 1 to be written in element TX4.TY32 of the register is question by means of the circuit:

$$\text{MAN.TX4.TY32}-\text{SBN} \quad (4)$$

the suffix "N" in the writing signal SBN being a general reference to the track in use.

If relay MAN has not been set when element TX4.TY32 of the register is being scanned, indicating that the subscriber's loop is open, either because dialling is taking place, or because the subscriber has replaced his handset, the signal from the reset output of relay MAN is used to record a 0 in element TX4.TY32 by means of the circuit:

$$\underline{\text{MAN}}\text{.TX4.TY32}-\text{SAN}$$

It will be seen later that relay MAN is normally in the set condition during the scan of blocks TY1—31 of a register, so that it is not necessary to use the timing pulse TY32 in the above coincidence circuit, which may therefore be simplified to:

$$\underline{\text{MAN}}\text{.TX4}-\text{SAN} \quad (5)$$

The commencement of a dialled impulse is recognised by the change in the condition of the subscriber's line from "loop closed" to "loop open." If during the scan of a register it is found that relay MAN is in its reset condition during the timing pulse TX4.TY32, it is assumed that a dialled impulse is being received, and the signal from the reset output of relay MAN is used to register a 1 marking representing the impulse in one of the elements TX5 or TX6 of block TY32. Of these, element TX5 is normally used, but if the dialled impulses are being received at a rate considerably in excess of ten impulses per second it is possible that a second impulse may be received before the first has been transferred to its appropriate digit storage position by the common scanning equipment and in this case the second impulse will be stored in element TX6. It is, therefore, necessary to detect whether element TX5 is occupied before a marking is written there and the signal from the read head is used to ensure that the marking representing the impulse is stored in the first of the two elements in which a 0 is stored. The marking circuit is:

$$\underline{\text{MAN}}.\underline{\text{SLN}}.(\text{TX5}+6)-\text{SBN} \qquad (6)$$

If the marking is to be written in element TX5, it is necessary to ensure that it is not written in TX6 as well and this is prevented by using the signal $\underline{\text{SLN}}$ read during the scan of element TX5 to set relay $\underline{\text{MAN}}$, so that the circuit (6) is ineffective during the scan of the following element TX6. Relay MAN is set by the circuit:

$$\underline{\text{SLN}}.(\text{TX4}-6)-\text{MAN} \qquad (7)$$

It will be seen that the timing pulse TX4 is included in this coincidence circuit. This is to ensure that the same impulse is not registered twice. If on two successive scans the "loop open" condition is detected on the impulsing lead, relay MAN would be reset on both scans and on the second scan the 0 previously written in element TX4 by the circuit:

$$\underline{\text{MAN}}.\text{TX4}-\text{SAN} \qquad (5)$$

would be encountered. Relay MAN is therefore set when a 0 is detected in element TX4 of block TY32 to prevent a false impulse marking being registered in element TX5 or TX6.

It was mentioned earlier that relay MAN is normally in the set condition during the scan of the track section TY1–31, and it will be apparent that the circuits just referred to will produce this effect, since there will always be a 0 in at least one of the elements TX4—6 of block TY32 to cause relay MAN to be set. Relay MAN is reset at the beginning at the scan of block TY32 in each register ready for use in detecting the condition of the subscriber's line by means of the circuit:

$$\text{TX1.TY32}-\underline{\text{MAN}} \qquad (8)$$

Relay MAN is set during alternate scans by the track equipment of section T1 of the register track by circuit (1) or (2) above and causes a 1 marking to be written in element TX4.TY32 of this section by means of the circuit (4). This marking will be detected on the following scan when relay MAN will be in the reset condition and will cause a 1 to be written in element

TX5.TY32.TZ1 by means of circuit (6), the 1 marking in element TX4 being itself cancelled by means of circuit (5). The marking in element TX5.TY32.TZ1 will later be removed by the common equipment, but in the meantime, on the following scan by the track equipment, relay MAN will again be set by circuit (1) or (2) and will cause a 1 to be written again in element TX4.TY32.TZ1. The detection of this on the following scan will cause a 1 to be written in the following element TX6, this marking being later removed together with that in TX5 by the common equipment. These operations will continue on subsequent scans and serve to check the correct operation of the reading and writing equipment of the individual track equipment. A further two circuits are provided to ensure that relay MAN is operating correctly. The first of these produces a fault signal POT if relay MAN has not been reset by circuit (8) during the timing pulse TX1.TY32. This circuit is:

$$\text{MAN.TX2.TY32}-\text{POT} \qquad (9)$$

The other circuit produces a fault signal if relay MAN is not set by circuit (7), the test being made during the scan of element TX1.TY1 of the following register. This circuit is:

$$\underline{\text{MAN}}.\text{TX1.TY1}-\text{POT} \qquad (10)$$

*Sequence 2: (Equipment common to all register tracks).*—Adding temporarily stored impulse marking to appropriate storage block, cancellation of temporary markings, cancellation of inter-digital pause timing markings, cancellation of timing count.

The common equipment examines the temporary storage elements (TX5+6).TY32 in each register on all six register tracks in turn, and transfers the markings stored in them to the appropriate one of the digit storage blocks TY13—21 of the register. Because the digit storage elements in a register are scanned in advance of the temporary storage elements by the read and write heads, when it is necessary to transfer markings from the temporary to the permanent store, examination of the temporary storage elements by the common equipment is effected by means of a so-called "pre-read" head. This is positioned at a distance corresponding to the track length occupied by one register in advance of the normal read head. This enables information stored in a register to be read before the register passes the write head, so that information may be advanced in position within the register, either with or without manipulation. The suffix "P" is used to identify signals read by a pre-read head, the output signal SLP being obtained when the pre-read head encounters a 1 marking on a register track.

A relay MAB is set if the pre-read head detects a 1 in element TX4.TY32 of a register, indicating that the subscriber's line is looped. The circuit is:

$$\text{SLP.TX4.TY32}-\text{MAB} \qquad (1)$$

A circuit is provided for writing in the previously-mentioned "initial digit" in block TY4 of a register which is transmitted in advance of the routing digits to position the first routing selector. Detection of the 1 marking in element TX4.TY32 initiates the writing of the initial digit in block TY4, both the incoming and outgoing busy elements TX1 and TX2 being marked with a 1. A circuit is provided for resetting relay MAB if these elements have already been marked, it being only necessary to detect a 1 marking in element TX1.TY4. This circuit is:

$$\text{SLS.TX1.TY4}-\underline{\text{MAB}} \qquad (2)$$

If relay MAB remains in the set condition, a 1 is written in the incoming and outgoing busy elements of the initial digit storage block by means of the circuits:

$$\text{MAB.TX1.TY4}-\text{SBS} \qquad (3)$$

and $$\text{MAB.TX2.TY4}-\text{SBS} \qquad (4)$$

The initial digit is then written in by means of a circuit including the appropriate ones of the timing pulses TX3—6, which for convenience may be designated IDM. This circuit may be written:

$$\text{MAB.IDM.TY4}-\text{SBS} \qquad (5)$$

The circuit (2) prevents a repetition of the operation of these three circuits on subsequent scans. Relay MAB is reset in time for the scan of the block TY32 of the following register by the pre-read head by means of the circuit:

$$\text{TY31}-\underline{\text{MAB}} \qquad (6)$$

A relay MBB is set if the pre-read head detects a 1 marking in the temporary storage element TX5.TY32 of a register, and a second relay MCB is set if a further marking is detected in element TX6.TY32. These circuits are:

$$\text{SLP.(TX5+6).TY32}-\text{MBB} \qquad (7)$$

and $$\text{MBB.SLP.(TX5+6).TY32}-\text{MCB} \qquad (8)$$

The composite timing pulse (TX5+6) is used in the first of these two circuits merely for convenience and saves having to provide a special output circuit for pulse TX5.TY32. When relay MBB, or relays MBB and MCB, have been set, the temporary markings may be removed from block TY32, and elements TX3—6 of this storage block are, in fact, cleared on each scan by the common equipment by means of the circuit:

$$\mathrm{(TX3-6).TY32-SAS} \qquad (9)$$

It is also necessary to cancel markings which have been made in block TY1, where inter-digital pause timing takes place, the circuits for which will be described in detail later. The cancellation circuit, which operates on each scan, is:

$$\mathrm{(TX5+6).TY1-SAS} \qquad (10)$$

The common equipment must now determine to which digits the latest received impulse or impulses belong, and must transfer them to the appropriate digit storage block. In all the digit storage blocks TY13—21, element TX1 is used to indicate whether or not the block has a complete digit stored in it. When a complete digit has been registered in one of these blocks, element TX1 of that particular block is marked with a 1, the marking being written when an inter-digital pause is detected. When a digit storage block is empty or contains an incomplete digit, element TX1 is marked with a 0. When the common equipment is searching for the correct storage block in which to register a dialled impulse, it is only necessary for the reading head to find the first digit storage block with a 0 written in element TX1 and this will be the one awaiting the next impulse. When the required storage block has been located, a relay MDB is set by means of the circuit:

$$\mathrm{MBB.\underline{SLS}.TX1.(TY13-29)-MDB} \qquad (11)$$

When a 1 is to be added to a number in binary form, the well-known rule is to change 1's to 0's and 0's to 1's in turn, starting from the lowest order, until a 0 has been changed to a 1. When two is to be added, no change is made to the lowest order symbol but the foregoing rule is applied to the remaining symbols. In the present case the lowest order marking is stored in element TX3, which is the first of the four elements of the digit store to pass under the reading head. The adding circuits are as follows:

$$\mathrm{\underline{MCB}.MDB-SAS} \qquad (12)$$
$$\mathrm{\underline{MCB}.MDB.\underline{SLS}.(TX3-6)-SBS} \qquad (13)$$
$$\mathrm{MCB.MDB.TX3-\underline{MCB}} \qquad (14)$$
$$\mathrm{\underline{MCB}.MDB.\underline{SLS}.(TX3-6)-\underline{MBB}} \qquad (15)$$
$$\mathrm{\underline{MCB}.MDB.\underline{SLS}.(TX3-6)-MCB} \qquad (16)$$

and $$\mathrm{\underline{MCB}.MDB.\underline{SLS}.(TX3-6)-\underline{MDB}} \qquad (17)$$

The first of these circuits (12) attempts to write 0 in each of the four digit storage elements of the block identified by the set condition of relay MDB, while the second circuit (13) writes 1 in each of the four digit storage elements in which a 0 is read, thus reversing the marking in each element. This reversal process is terminated when the reading head encounters the first 0, i.e. when the first signal $\underline{\mathrm{SLS}}$ occurs, this signal setting relay MCB in circuit (16) and resetting relay MDB in circuit (17), thus preventing further operation of circuits (12) and (13). When two is to be added to the stored number, relay MCB is in the set condition, so that circuits (12) and (13) are inoperative until circuit (14) has operated to cause relay MCB to be reset. The last two circuits (16) and (17) therefore do not become effective to stop the adding processes until after the scan of element TX3, containing the lowest order marking, so that the conditions for adding two to a binary number are satisfied. Relay MBB is reset by circuit (15) to prevent the operation of circuit (11) at the beginning of the scan of the next digit storage block.

When the calling subscriber seizes a register, a forced release timing circuit employing block TY31 of the register is brought into operation. This timing circuit functions by detecting 0's in the incoming busy elements of the digit storage blocks of the register. The timing count is cancelled each time a train of dialled impulses is received, the set condition of relay MCB and the reset condition of relay MBB being used, so that the timing count cancelling circuit only operates when an impulse has been added to an incomplete digit. The circuit is:

$$\mathrm{\underline{MBB}.MCB.TY31-SAS} \qquad (18)$$

*Sequence 3.*—Detection of inter-digital pause, registration of busy marking in digit store last used.

The process of transferring markings from the temporary storage elements TX5 and TX6 of block TY32 to the appropriate digit storage block continues until the end of an impulse train is reached. During the train of impulses, relay MBB is set on each scan of the register by the pre-read head, and is reset during the scan by the normal read and write heads when an impulse has been added to the appropriate incomplete digit. On the scan following the receipt of the last impulse of a train, relay MBB will be found in the reset condition and this is used to initiate the inter-digital pause timing by marking a 1 in element TX5.TY1 by means of the circuit:

$$\mathrm{\underline{MBB}.TX5.TY1-SBS} \qquad (19)$$

It is possible that relay MBB can be found in the reset condition during the occurrence of this timing pulse if the impulse repetition rate is much less than 10 i.p.s., but unless the reset condition of relay MBB is caused by the inter-digital pause, the relay will be set during the following scan of the register and this will enable the previously-mentioned circuit:

$$\mathrm{(TX5+6).TY1-SAS} \qquad (10)$$

to become operative and the 1 marking in element TX5.TY1 will be cancelled. If the marking remains in this element during the following scan, it is assumed that the inter-digital pause is in progress and the circuit (19) regenerates the marking in preference to the cancellation signal produced by circuit (10). At the same time, a relay MEB is set upon the detection of the 1 marking in element TX5.TY1 by means of the circuit:

$$\mathrm{\underline{MBB}.SLS.TX5.TY1-MEB} \qquad (20)$$

and it will be seen that this relay is set after a pause of 200 ms. following the registration of the last impulse of the train. A marking indicative of the inter-digital pause is written in element TX6.TY1 by means of the circuit:

$$\mathrm{MEB.TY1-SBS} \qquad (21)$$

It is necessary to mark with a 1 the incoming busy element TX1 of the digit store in which the last received digit has been registered, so that the next digit will be registered in the following store. The set condition of relay MEB is used to write a 1 in element TX1 of this storage block, the circuit being:

$$\mathrm{MEB.\underline{MFB}.TX1.(TY13-29)-SBS} \qquad (22)$$

The reset condition of relay MFB is included in this circuit to prevent the circuit being operative at a later stage when the calling subscriber replaces his receiver and it is necessary to release the register. When the first digit storage block in which the TX1 element is marked with a 0 is encountered, i.e. the storage block in which it is now required to mark the incoming busy element with a 1, relay MEB is reset so that the circuit (22) is prevented from marking the incoming busy elements of the remaining digit storage blocks encountered in the same scan. The resetting circuit is:

$$\mathrm{\underline{MFB}.\underline{SLS}.TX1.(TY13-29)-\underline{MEB}} \qquad (23)$$

A further circuit is provided which prevents circuit (22) from becoming operative during the following scans, relay MEB being reset when the previously-mentioned marking is encountered in element TX6.TY1. This circuit is:

$$\mathrm{MEB.\underline{MFB}.SLS.TY1-\underline{MEB}} \qquad (24)$$

The timing pulse TX6 is not required in this coincidence because relay MEB is only set during the timing pulse TX5 and the operation of the last-mentioned circuit is therefore confined to the scan of element TX6.TY1. The reset condition of relay MFB is again included in these last two circuits to prevent their operation during the reelase condition.

*Sequence 4.*—Detection of subscriber's replacing handset, clearance of register and release of relay set.

When the calling subscriber replaces his handset, either before or after dialling is completed, the signal equipment detects the condition as a line break longer than that of a normal dialled impulse. This is first detected by the preread head during the scan of element TX4.TY32. It will be recalled that in this element a 0 is written when the impulsing lead from the relay set indicates that the subscriber's line loop is open. When this occurs, a relay MFB is set by the circuit:

$$\underline{\mathrm{SLP}}.\mathrm{TX4.TY32{-}MFB} \qquad (25)$$

The two previously-mentioned circuits:

$$\underline{\mathrm{MBB}}.\mathrm{TX5.TY1{-}SBS} \qquad (19)$$

and $$\underline{\mathrm{MBB}}.\mathrm{SLS.TX5.TY1{-}MEB} \qquad (20)$$

will operate when no further impulse is registered after pauses of 100 ms. and 200 ms. respectively and the coincidence of the set conditions of these two relays may conveniently be used to initiate the clearance of 1 markings from the register. Relay MFB must be reset however if a further impulse is registered and this is provided for by the circuit:

$$\mathrm{SLP.(TX5{+}6).TY32{-}}\underline{\mathrm{MFB}} \qquad (26)$$

If relay MFB is not reset by this circuit, the set condition of the two relays MEB and MFB is effective during the scan of the register by the writing head in cancelling existing 1 markings by means of the circuit:

$$\mathrm{MEB.MFB.{-}SAS} \qquad (27)$$

A forced release signal is also generated during the scan of the register in these conditions by the circuit:

$$\mathrm{MEB.MFB.TY30{-}POF} \qquad (28)$$

the POF signal being effective in releasing the access relay set.

The resetting circuit for the relays employed in the foregoing circuits are not dependent upon the register clearance condition and relays MBB and MDB are reset during each scan of block TY31 by the circuit:

$$\mathrm{TY31{-}}\underline{\mathrm{MBB}}\text{ and }\underline{\mathrm{MDB}} \qquad (29)$$

Relay MCB cannot be reset during the scan of this block because it is required to be in the set condition at that time by the previously-mentioned circuit (18). Relays MEB and MFB must remain operative in case the register has to be cleared, and therefore cannot be reset before the scan of element TX2.TY32, the previously-mentioned circuits (9) and (10) providing the conditions for clearing 1 markings from the remainder of block TY32 and from elements TX5 and TX6 of block TY1 respectively. It is therefore convenient to reset relays MCB, MEB and MFB during the timing pulse TX2.TY32, the circuit for this being:

$$\mathrm{TX2.TY32{-}}\underline{\mathrm{MCB}},\ \underline{\mathrm{MEB}},\ \underline{\mathrm{MFB}} \qquad (30)$$

It has been mentioned that the first register on each track is not used for registering dialled impulses, the reason for this being that it is not readily possible to scan this register with the pre-read head immediately before the scan by the normal read head because of the difficulties involved in switching the pre-read head in advance of the normal read head. A permanent cancellation signal is provided for this register, the circuit being:

$$\mathrm{TZ1{-}SAS} \qquad (31)$$

*Check Circuit for Individual Track Circuits*

It was previously-mentioned that use is made of relay MAN to write in markings representing artificial dialled impulses in the register section TZ1 of a track, which are later detected and serve to check that the individual track equipment, together with the reading and writing heads, are functioning correctly. It will be recalled that two circuits are employed for setting the relays MAN associated with odd and even tracks respectively during the scan of this track section, these being:

$$\mathrm{TX3.TY32.TZ1.(TW2{+}4){-}MAN} \qquad (1)$$

and $$\mathrm{TX3.TY32.TZ1.(TW1{+}3){-}MAN} \qquad (2)$$

These circuits result in the writing of a 1 in element TX4.TY32 by the previously-mentioned circuit:

$$\mathrm{MAN.TX4.TY32{-}SBN} \qquad (4)$$

on alternate rotations of the drum, the marking being cancelled on intervening rotations by means of the circuit:

$$\underline{\mathrm{MAN}}.\mathrm{TX4{-}SAN} \qquad (5)$$

the relay MAN having been set before the operation of circuits (1) and (2) by means of the circuit:

$$\mathrm{TX1.TY32{-}}\underline{\mathrm{MAN}} \qquad (8)$$

The appearance of 1 markings in element TX4.TY32 of this register section simulates the reception of two dialled impulses during the scan of the register by the common equipment and markings are therefore written in the temporary storage elements TX5 and TX6 of block TY32 by means of the circuit:

$$\underline{\mathrm{MAN}}.\underline{\mathrm{SLN}}.\mathrm{(TX5{+}6){-}SBN} \qquad (6)$$

The registration of these two markings is later checked by an alarm circuit:

$$\underline{\mathrm{SLS}}.\mathrm{(TX5{+}6).TY32.TZ1{-}POT} \qquad (32)$$

which provides an alarm signal POT if the two markings are not present. The markings are cancelled on each scan by the common equipment by means of the previously-mentioned circuit:

$$\mathrm{TZ1{-}SAS} \qquad (31)$$

and are re-written during each subsequent scan by the common equipment. Since no attempt is made to switch the pre-read head in advance of the normal read head, the pre-read head will scan the first register section (TZ1) of the track while the main heads are scanning the last register (TZ9). Advantage is taken of this to check that the markings in elements TX5 and TX6 of block TY32 of the register section TZ1 have been cancelled by circuit (31). The checking circuit used is:

$$\mathrm{SLP.(TX5{+}6).TY32.TZ9{-}POT} \qquad (33)$$

an alarm being given if circuit (31) has failed to clear the register section.

The routine testing circuits for the common registering equipment also take into use and test the common translating equipment. The translation process will therefore be described first so that the register equipment test circuits may be fully understood.

*Translation of 3-, 4- and 5-Digit Codes*

When a code stored in a register is to be translated, the transfer track is seized as it becomes free and the code digits are transferred to it. The transfer track, as previously mentioned, is a regenerative track eight TY blocks long, i.e. the reading head is positioned eight TY blocks behind the writing head. Information stored on the transfer track is therefore circulated round the drum and can be compared with permanent information stored on one or more address tracks. To obtain the required translation, the output from the reading heads on the transfer and address tracks are continuously compared until an address code corresponding to the code circulating on the transfer track is detected and at this instant reference is made to the library for a translation, which is stored at a position corresponding to the located address.

In a previous practical register translator, it was necessary to distribute the library information over a number of library tracks, since there were too many translations to be accommodated on a single track even if 3-digit codes only were employed. Where more than one library track is used, it is convenient to use one of the code digits to select the track on which the translation is to be found, and to use the remaining code digits to select the translation on that track. These remaining digits are circulated on the transfer track until they reach a point corresponding to an address on the address track containing the same combination of digits, at which point the appropriate translation may be read from the selected library track. In a typical arrangement, 1,000 translations are distributed over ten library tracks and the A-digit is used to select the library track required, the B- and C-digits being employed to select the address.

In the present embodiment, each library track contains only 50 translations, so that 20 library tracks are required to accommodate the 1,000 possible combinations of the three code digits. The tracks are arranged in pairs, the A-digit being used to select a pair of tracks. In each pair, one track contains translations for codes in which the B-digit is an odd number and the other track contains translations for codes in which the B-digit is an even number. In addition to selecting a track by means of the A-digit, it is thus also necessary to determine whether the B-digit is odd or even in making the selection.

The library is further capable of supplying translations for 4- and 5-digit codes, these translations being accommodated on additional library tracks. Each 4-digit code is an expansion of a 3-digit code and each 5-digit code is an expansion of a 4-digit code. In the present embodiment, five additional pairs of tracks are employed to accommodate the translations of 4- and 5-digit codes. Since the majority of translations required will be for 3-digit codes, a saving of time in setting up a connection can be achieved by applying for a translation as soon as the 3rd code digit has been registered. If the three code digits received, form a complete code, translation proceeds normally, the routing digits provided by the library being returned via the transfer track to the register in blocks TY6—TY11, together with a meter code digit in block TY5 and a transmission control digit in block TY12. If the first three digits registered are part of a 4-digit code, when translation is applied for after receipt of the 3rd digit an intermediate translation is obtained which indicates that a further dialled digit is required. This intermediate translation contains a new A-digit and a new B-digit, which together are able to select a further library track on which translations of 4-digit codes are located. These two new digits are not returned to the A- and B-digit store blocks of the register, but are transferred to blocks TY5 and TY7 and are later copied on to the transfer track again, together with the 4th code digit, or D-digit, when the latter has been received. The translation for the 4-digit code may thus be obtained without referring back to the register for the original A-, B- and C-digits.

If the four registered digits are part of a 5-digit code, this will be indicated by a second intermediate translation obtained from the library address selected by the second B-digit and the D-digit together. The second intermediate translation provides a still further A-digit and B-digit, which together are able to select a further library track on which 5-digit code translations are located. In this case, the new A- and B-digits are written in blocks TY5 and TY8 of the register respectively and these digits are returned to the transfer track together with the E-digit when the latter has been received. This new code enables the appropriate translation to be found among the 5-digit code translations in the library. In the present embodiment, 20 of the 3-digit codes are expanded to 4-digit codes, providing a further 200 codes, for which a further four library tracks are required, and 30 of the 4-digit codes are expanded to 5-digit codes, providing a further 300 codes which require six additional library tracks. There are thus 30 library tracks altogether.

The permanently stored addresses with which the information circulating on the transfer track is compared must occupy positions on the address track which correspond to the positions on the library tracks occupied by the relevant translation information. Since on the library tracks translations of codes containing two possible values (odd or even) of the B-digit are located at the same address, although these are on different tracks, the address track must also be arranged so that addresses containing either of these two values of B-digit both occupy the same position on the drum corresponding to the appropriate library information. It will be apparent that the code circulating on the transfer track must therefore make a selection between two address tracks to identify a translation address. The arrangement of the address tracks is, however, complicated by the fact that the position within the address blocks of the address digits of expanded codes is different from the position of the address digits (B and C) of a 3-digit code. This will be obvious from the fact that the C-, D- and E-digits must be registered in different TY blocks in the register, and in fact the addresses of 3-, 4- and 5-digit codes occur respectively in blocks TY14—15, TY15—16 and TY16—17 and also at positions removed from these by multiples of eight TY blocks.

A possible solution to the problem would be to provide three pairs of address tracks to cater respectively for the three different types of code, amounting to six address tracks in all. According to the invention, however, the number of address tracks required can be reduced to three by employing the arrangement shown in FIG. 4(*d*). The first two tracks, SL1 and SL2, discriminate between the odd and even values of the B-digit, while the third track SL3 contains the ten possible values of the C-, D- or E-digits for each value of B-digit on track SL1 or SL2. In FIG. 4(*d*) a short section of the three tracks is shown, in which each TY block is indicated by a number, and it will be seen that these are arranged in groups of eight TY blocks, a group corresponding in length to the transfer track. Each successive group of eight TY blocks is marked with a different digit 1—0 on track SL3, while tracks SL1 and SL2 contain the same odd or even digit repeated for the whole sequence of digits on track SL3. The general arrangement will be seen more clearly from FIG. 4(*e*), where the layout of the three complete tracks is shown. From this figure it will be seen that on track SL3, the sequence of digits 1—0 is repeated every 80 TY blocks, while on track SL1 each odd digit appears in turn, each being repeated in 80 successive TY blocks, and in track SL2 even digits are similarly arranged.

In search for an address, the odd or even nature of the B-digit selects track SL1 or SL2, the actual value of the B-digit, regardless of whether it is the original dialled digit or a B-digit obtained from an intermediate translation, determining in which section of track the required address is located. The C-, D- or E-digit is now able to select, within the section of 80 TY blocks selected by the B-digit, the one group of eight TY blocks which defines the address of the required translation. It will be seen from FIG. 4(*d*) that no digit is permanently stored in the last TY block of each group of eight in tracks SL1 and SL2, nor in the first TY block of each group on track SL3. The reason for this is that each address circulating on the transfer track contains two digits, which are of necessity in alphabetical order, i.e. the B-digit must always precede the C-, D- or E-digit, so that a B-digit can never occupy the last TY block of the transfer track (TY12, TY20, TY28 and TY4), and the C-, D- and E-digit will never appear in the first TY block of the transfer track (TY5, TY13, TY21 and TY29).

The circuit will be described with reference to FIG. 6,

*Sequence 1.*—Detection of register awaiting translation, provision of identification marking, transfer of code digits to transfer track, marking transfer track "busy," selection of required library track.

A relay MAC is set during the scan of each register if the transfer track is free. This is indicated by the marking in the first storage element of the track (TX1.TY5), a 0 in this element indicating that the transfer track is free. The relay is set by the circuit:

$$\underline{SLT}.TX1.TY5—MAC \quad (1)$$

If relay MAC has been set, the dialled code, or an intermediate translation and the D- or E-digit in the case of 4- and 5-digit codes, may be transferred to the transfer track.

The pre-read head is used in the transfer of code digits from the register, so that the identification marking, which is contained in element TX4.TY1 of a register, can be written in after the transfer track has been seized by a register. This marking is detected before the digit stores of the register are scanned when the translation is being returned to the register. The translation of a code can therefore be effected in the same revolution of the drum as that in which the transfer track has become free. If a 4- or 5-digit code is being transferred intermediate translation digits will be stored in blocks TY5—9 of the register and the detection of such stored digits by the pre-read head set a relay MFC and also copies the digits on to the transfer track, these operations employing two circuits:

$$MAC.SLP.(TY5—11)—MFC \quad (2)$$

and $$MAC.SLP.(TY5—11)—SBT \quad (3)$$

In the case of a 3-digit code, the A-, B- and C-digits will be stored in blocks TY13, 14 and 15 of the register, and the A- and B-digits can be transferred by means of the circuit:

$$MAC.\underline{MFC}.SLP.(TY13+14)—SBT \quad (4)$$

the reset condition of relay MFC being included in the circuit to prevent the original A- and B-digits being copied after an intermediate translation has been provided. The incoming busy marking in the TX1 element of the A-digit storage block (TX1.TY13) provides a busy marking in the transfer track, this marking being transferred to the first element of the transfer track because of the repetition of the latter after eight TY blocks. Relay MAC therefore cannot be set during the scan of subsequent registers by circuit (1) until the transfer track has been released. In the case of 4- and 5-digit codes, markings in block TY13 of the register are not copied into the transfer track because the set condition of relay MFC inhibits the operation of circuit (4), and a further circuit is therefore provided to write a busy marking on the transfer track in these circumstances. This circuit is:

$$MAC.TX1.TY13—SBT \quad (5)$$

When the pre-read head scans blocks TY15—17, the C-, D- or E-digit will be copied on to the transfer track according to whether the A- and B-digits already copied are dialled code digits or whether they are the result of a first or second intermediate translation respectively. The following circuit is involved:

$$MAC.SLP.\underline{SLT}.TX1.(TY15—17)—MBC \quad (6)$$

This circuit will operate at the beginning of the scan by the pre-read head of the C-digit storage block, the D-digit storage block or the E-digit storage block, the actual instant of operation being determined by the inclusion of the signal $\underline{SLT}$, which will only appear where a 0 is read from the transfer track. As previously mentioned, the transfer track reading head is positioned 8 TY blocks behind the writing head and in the first case i.e. the A- and B-digits already copied are dialled code digits, since copying has taken place at timing periods TY13 and TY14, a 0 will be read by the transfer track read head when the pre-read head scans block TY15, because circulation of the digits on the transfer track round the drum has not yet begun. Circuit (6) will therefore operate at the timing period TX1.TY15, relay MBC is set and the C-digit is copied on to the transfer track. In the second case mentioned above i.e. the A- and B-digits are the result of a first intermediate translation, the digits will be copied as the pre-read head scans blocks TY5 and 7 so that when the pre-read head is scanning block TY15, circulation of the digits on the transfer track will have begun and the transfer track read head will be scanning a block containing the B-digit so that the $\underline{SLT}$ signal will not appear during this timing period and relay MBC is not set. However when the pre-read head is scanning block TY16, the transfer track read head will be scanning an unoccupied block and circuit (6) will therefore operate at timing period TX1.TY16, relay MBC will be set and the D-digit will be copied on to the transfer track. Finally in the third case i.e. the A- and B-digits result from a second intermediate translation, the digits will be copied as the pre-read head scans blocks TY5 and 8. In addition the translation provides an incoming busy dot at TX1.TY7 as will be explained subsequently so that as the pre-read head scans blocks TY15 and TY16, the transfer track reading head will be scanning occupied blocks and circuit (6) will be ineffective. However, when the pre-read head scans block TY17, the transfer track reading head will be scanning an unoccupied block and circuit (6 )will operate, relay MBC will be set and the E-digit will be copied on to the transfer track.

The appropriate code digit C, D or E is copied on to the transfer track by means of the circuit:

$$MAC.MBC.SLP—SBT \quad (7)$$

With relays MAC and MBC both in the set condition, a signal LTR is generated, which resets the library track switching equipment:

$$MAC.MBC—LTR \quad (8)$$

When the last dialled code digit has been copied on to the transfer track, relay MAC is reset to prevent further markings being transferred from the register. Relay MAC is reset by the circuit:

$$MBC.TX6—\underline{MAC} \quad (9)$$

no TY timing pulse being required, since in each case relay MAC will be reset at the end of the scan of the TY block in which relay MBC is set.

If the last code digit has not been registered or if translation has already taken place for the particular register, the incoming busy elements (TX1) of blocks TY7—9 of the transfer track will be marked with a 1 and the circuit:

$$MAC.SLP.\underline{SLT}.TX1.(TY15—17)—MBC \quad (6)$$

will not operate. Consequently relay MBC will remain in the reset condition throughout the scan of the register by the pre-read head, and relay MAC will not be reset by the circuit:

$$MBC.TX6—\underline{MAC} \quad (9)$$

It follows that, if translation is not required after the transfer track has been seized, relay MAC will remain in the set condition until it is subsequently reset at the end of the scan of the register and this condition can be used to cancel the transfer track. This is done by writing 0 in each element of the transfer track by means of the circuit:

$$MAC.(TY21—28)—SAT \quad (10)$$

During the scan of the register requiring translation by the normal read and write heads, the set condition of relay MBC is used to provide an identification marking in element TX4.TY1 of the register by means of the circuit:

$$MBC.TX4.TY1—SBS \quad (11)$$

It will be seen from the coincidence circuit (6) that relay MBC was set during the scan by the pre-read head of element TX1 of the C-, D- or E-digit storage block, so that in the transfer of this digit to the transfer track, which is dependent upon relay MBC being in the set condition, the incoming busy marking of the digit was not transferred. A further circuit is therefore provided which marks the TX1 elements of all the code digits on the transfer track during the scan of the register by the normal read head. This circuit is:

$$\mathrm{MBC.TX1.(TY5{-}11){-}SBT} \qquad (12)$$

The A- and B-digits now stored on the transfer track are used to select the required library track and also the required pair of address tracks by means of a circuit which will be described later and which may conveniently be referred to by the reference "LTS." The circuit LTS is operated by the A- and B-digit markings in the circuit:

$$\mathrm{MBC.SLT.(TY5{-}11){-}LTS} \qquad (13)$$

Relay MBC may be reset after the scan of block TX11 and it is in fact reset during the scan of block TY12, so as to be in the reset condition when the pre-read head is scanning block TY15 of the following register. The resetting circuit is:

$$\mathrm{TY12{-}\underline{MBC}} \qquad (14)$$

Relay MAC is reset at the end of the scan of the register by means of the circuit:

$$\mathrm{TY32{-}\underline{MAC}} \qquad (15)$$

*Sequence 2.*—Search for address, detection of required address, transfer of translation to transfer track.

A composite address signal designated "SLA" comprises a combination of signals read from the selected one of address tracks SL1 and SL2 together with signals from address track SL3. The circuit for obtaining signal SLA will be described later. Signals read from the transfer track are continually compared with the address signal SLA until coincidence of address digits is obtained.

A relay MCC is set by a signal generated at the beginning of each address in a group of eight TY blocks on the address tracks, the circuit being:

$$\mathrm{SLA.TX2{-}MCC} \qquad (16)$$

It is arranged that relay MCC is reset if the signals read from the transfer and address tracks are different. Two circuits are employed:

$$\mathrm{MCC.SLA.\underline{SLT}{-}\underline{MCC}} \qquad (17)$$

and $$\mathrm{\underline{SLA}.SLT{-}\underline{MCC}} \qquad (18)$$

The first of these circuits resets relay MCC if a 1 is read from the address tracks at the same time as a 0 is read from the transfer track, while the second resets relay MCC if a 0 is read from the address tracks at the same time as a 1 is read from the transfer track. It will be noted that since relay MCC is only set during the scan of element TX2 of the first TY block of the address which is marked with a 1 on the address tracks, only the actual numerical markings of the first address digit are used in the comparison. The second digit of the address, on the address track SL3, has its element TX1 marked with a 1 but its element TX2 is marked with a 0. This corresponds to the address marking circulating on the transfer track, and the second address digits may be compared in all six storage elements. The 0 marking in element TX2 of this digit on track SL3 prevents relay MCC being set by circuit (16) for this digit if it has been reset by lack of coincidence in the first address digit.

When the correct address has been found, relay MCC will remain in the set condition throughout the scan of the address group and when this occurs, a relay MDC is set by means of the circuit:

$$\mathrm{MCC.TX6.(TY4{+}12{+}20{+}28){-}MDC\ and\ LTT} \qquad (19)$$

It will be seen that this timing pulse occurs at the end of the scan of the address group, which also coincides with the end of the transfer track. The signal LTT is concerned with testing of the library track switching circuits and will be referred to in detail later.

When relay MDC has been set, the appropriate translation information may be read from the selected library track, the translation on the library tracks being located in the section of eight TY blocks immediately following the corresponding address section on the address tracks. The translation is written on to the transfer track by means of the two circuits:

$$\mathrm{MDC.SLL{-}SBT} \qquad (20)$$

and $$\mathrm{MDC{-}SAT} \qquad (21)$$

The second of these two circuits tends to write a 0 in each element of the transfer track, while the first circuit writes a 1 on the transfer track each time a 1 is read from the selected library track. Since the writing circuits are arranged so that a 1 is alway written in preference to a 0, the library information will be copied by these circuits on to the transfer track.

Relay MDC is reset at the end of the translation section so that the following translation is not copied. The same timing signal is used as was employed for setting the relay, the circuit being:

$$\mathrm{MDC.TX6.(TY4{+}12{+}20{+}28){-}\underline{MDC}} \qquad (22)$$

*Sequence 3.*—Detection of originating register, transfer of translation to register and release of transfer track.

The translated code is now circulated on the transfer track until the originating register is reached. It will be recalled that this register was marked by writing a 1 in element TX4.TY1 and relay MEC is set when this marking is encountered on one of the register tracks by means of the circuit:

$$\mathrm{SLS.TX4.TY1{-}MEC} \qquad (23)$$

The identification marking is cancelled at the same time by means of the circuit:

$$\mathrm{TX4.TY1{-}SAS} \qquad (24)$$

this being effected one complete scan after the marking was originally written. This allows sufficient time for translation to take place.

Transfer of the translation code to the register is effected by the two circuits:

$$\mathrm{MEC.SLT.(TY5{-}11){-}SBS} \qquad (25)$$

and $$\mathrm{MEC.TY(5{-}11){-}SAS} \qquad (26)$$

These circuits are similar to those employed for writing the code on the transfer track, circuit (26) being used to cancel existing 1 markings in the routing digit storage blocks of the register and circuit (25) being used to write in the appropriate 1 markings as they are read from the transfer track.

The set condition of relay MEC is used in cancelling the transfer track markings by means of the circuit:

$$\mathrm{MEC.(TY5{-}12){-}SAT} \qquad (27)$$

This circuit writes a 0 in each element of the transfer track, thus allowing it to be taken into use by a subsequently scanned register.

In the event of an unused code being dialled, no translation would be returned to the register and this condition is detected by the circuit:

$$\mathrm{MEC.SLT.(TX3{-}6).(TY5{-}11){-}MFC} \qquad (28)$$

The relay MFC would not be set if no digits were read from the transfer track following the setting of relay MEC.

The transmission control digit written on the transfer track following the routing digits is not transferred to the register track, but the incoming and outgoing busy markings of this digit are written into the appropriate storage block of the register by the circuit:

$$\mathrm{MEC.SLT.(TX1{+}2).TY12{-}SBS} \qquad (29)$$

These markings provide for a 1600 ms. inter-train pause during digit transmission. The transmisison control digit is used to set a discriminating circuit, designated "DSD" as it is read from the transfer track, the circuit being:

MEC.SLT.TY12—DSD (30)

If, at the end of the scan of the register, relay MFC is found to be in the reset condition, indicating that an unused code has been dialled, a forced release signal POF is generated by the circuit:

MEC.$\underline{\text{MFC}}$.TY32—POF (31)

Relays MEC and MFC are reset during the scan of block TY32 so as to be ready for use by the next register, the resetting circuits being:

TY32—$\underline{\text{MEC}}$ (32)

and

TY32—$\underline{\text{MFC}}$ (33)

If the translation returned to the register is an intermediate translation for a 4-digit code, the intermediate A-digit will be stored in block TY5 of the register and the intermediate B-digit will be stored in block TY7. The new A-digit will have a 1 marking in element TX1 and a 0 in element TX2 and this prevents the digit being transmitted. The transfer track is taken into use during each scan of the register and is immediately released, until the D-digit has been received. Relay MFC is set by the previously-mentioned circuit:

MAC.SLP.(TY5—11)—MFC (2)

and the intermediate A- and B-digits are copied on to the transfer track by the circuit:

MAC.SLP.(TY5—11)—SBT (3)

Circuit (4) does not operate because relay MFC is now set but circuit (5) writes in a busy indication on the transfer track. Relay MBC is set during the timing pulse TX1.TY16 by the circuit:

MAC.SLP.$\underline{\text{SLT}}$.TX1.(TY15—17)—MBC (6)

since the D-digit storage block (TY8) of the transfer track will not have the TX1 element marked but the D-digit storage block (TY16) of the register track will have a complete digit stored in it and hence its TX1 element will be marked with a 1.

With relay MBC in the set condition, the D-digit is copied to the transfer track by means of the circuit:

MAC.MBC.SLP—SBT (7)

The remaining circuits will operate as previously described and the 4-digit code translation will be returned to the register in blocks TY5—12.

If the translation returned to the register indicates that the first four digits are part of a 5-digit code, the translation will comprise a second intermediate A-digit, stored in block TY5, and a second intermediate B-digit stored in block TY8. When the E-digit has been registered, the intermediate A- and B-digits will be first copied on to the transfer track and relay MBC will be set during the timing pulse TX1.TY17, since the E-digit storage block (TY9) on the transfer track will be empty and the E-digit storage block on the register track (TY17) will have a 1 marked in its incoming busy element. This digit will then be copied on to the transfer track and a translation obtained as previously described.

When the final translation is returned to the register, whether it is for a 3-, 4- or 5-digit code, all the TX1 and TX2 elements of the routing digits of the translation will be marked with a 1, and will be transmitted in turn. The transfer track will continue to be seized on each scan of the register, and the translation digits will be copied on to the transfer track, but since all the TX1 elements of the transfer track are now marked with a 1, circuit (6) is inoperable and relay MBC will remain reset. Thus the library track switching circuits will not be operated by an LTS signal produced by circuit (13), since this circuit will also be inoperable, and relay MAC will not be reset by circuit (9). The transfer track will be cancelled by circuit (10) in time for the scan of the next register by the pre-read head.

*Library Track and Address Track Switching Circuits*

These two circuits will be described with reference to FIGS. 7 and 8.

The library track switching circuit comprises seven relays, of which the first four, MAL, MBL, MCL and MDL, are used to register the A-digit. The fifth relay, MEL, is controlled by the odd or even nature of the B-digit; the sixth relay, MFL, is set in the case of a 4-digit code, and the remaining relay, MGL, is set in the case of a 5-digit code. If neither relay MFL nor MGL is set, a 3-digit code is indicated.

Relays MAL—MDL are set in accordance with the binary markings read from the A-digit storage block (TY5) of the transfer track following the production of signal LTS, by means of the previously-mentioned circuit:

MCB.SLT.(TY5—11)—LTS (13, FIG. 6)

The four relays are normally in the reset condition, and are set only when a 1 marking is encountered in the appropriate element of the A-digit storage block by means of the four circuits:

LTS.TX3.TY5—MAL (1)

LTS.TX4.TY5—MBL (2)

LTS.TX5.TY5—MCL (3)

and

LTS.TX6.TY5—MDL (4)

The combination of these four relays is able to select one of the ten pairs of library tracks on which 3-digit code translations are stored, and a further relay MEL is used to select one track of the pair. Relay MEL is set if the B-digit is odd, and remains in the reset condition if the B-digit is even. The circuit used for setting relay MEL is:

LTS.TX3.(TY6—11)—MEL (5)

In this circuit the odd or even nature of the B-digit is determined by the marking in the 2° element TX3, the circuit being operable during the timing pulse TX6—8 to cater for the three possible positions of the B-digit in 3-, 4- and 5-digit codes. The composite pulse TY6—11 is used for convenience, since this is already provided for use elsewhere in the circuit.

It will be recalled that the library track resetting signal LTR was generated by the previously-mentioned circuit:

MAC.MBC—LTR (8, FIG. 6)

which operates during the scan by the pre-read head of block TY15 in the case of a 3-digit code, during the scan of block TY16 in the case of a 4-digit code and during the scan of the block TY17 in the case of a 5-digit code. All the library track switching relays are reset upon the appearance of signal LTR, by means of the circuit:

LTR.TX2—$\underline{\text{MAL}}$,$\underline{\text{MBL}}$,$\underline{\text{MCL}}$,$\underline{\text{MDL}}$, $\underline{\text{MEL}}$,$\underline{\text{MFL}}$ and $\underline{\text{MGL}}$ (6)

This signal persists only as long as relay MAC is in the set condition, and in the case of a 3-digit code signal LTR will be terminated at the end of the scan of block TY15. In the case of a 4-digit code, it will commence at the beginning of the scan of block TY16 and will be terminated at the end of the scan of this block. In this case a relay MFL is set by the circuit:

LTR.(TX3—6).TY16—MFL (7)

In the case of a 5-digit code, signal LTR will be present during the scan of block TY17, and in this case relays MFL and MGL will both be set by the circuit:

$$\text{LTR.(TX3}-\text{6).TY17}-\text{MFL and MGL} \qquad (8)$$

*Selection of Library Tracks*

In the case of 3-digit codes, relays MAL—MEL are used to select the required one of the first 20 library tracks by means of relays LA1–20, the signal from the reset output of relay MFL being included in the selection circuits to confine the selection to the 3-digit code library tracks. The circuits for setting relays LA1–20 are as follows:

$$\text{MAL}.\underline{\text{MBL}}.\underline{\text{MCL}}.\underline{\text{MDL}}.\text{MEL}.\underline{\text{MFL}}-\text{LA1} \qquad (9)$$

$$\text{MAL}.\underline{\text{MBL}}.\underline{\text{MCL}}.\underline{\text{MDL}}.\underline{\text{MEL}}.\underline{\text{MFL}}-\text{LA2} \qquad (10)$$

$$\underline{\text{MAL}}.\text{MBL}.\underline{\text{MCL}}.\underline{\text{MDL}}.\text{MEL}.\underline{\text{MFL}}-\text{LA3} \qquad (11)$$

$$\underline{\text{MAL}}.\text{MBL}.\underline{\text{MCL}}.\underline{\text{MDL}}.\underline{\text{MEL}}.\underline{\text{MFL}}-\text{LA4} \qquad (12)$$

$$\text{MAL}.\text{MBL}.\underline{\text{MCL}}.\underline{\text{MDL}}.\text{MEL}.\underline{\text{MFL}}-\text{LA5} \qquad (13)$$

$$\text{MAL}.\text{MBL}.\underline{\text{MCL}}.\underline{\text{MDL}}.\underline{\text{MEL}}.\underline{\text{MFL}}-\text{LA6} \qquad (14)$$

$$\underline{\text{MAL}}.\underline{\text{MBL}}.\text{MCL}.\text{MEL}.\underline{\text{MFL}}-\text{LA7} \qquad (15)$$

$$\underline{\text{MAL}}.\underline{\text{MBL}}.\text{MCL}.\underline{\text{MEL}}.\underline{\text{MFL}}-\text{LA8} \qquad (16)$$

$$\text{MAL}.\underline{\text{MBL}}.\text{MCL}.\text{MEL}.\underline{\text{MFL}}-\text{LA9} \qquad (17)$$

$$\text{MAL}.\underline{\text{MBL}}.\text{MCL}.\underline{\text{MEL}}.\underline{\text{MFL}}-\text{LA10} \qquad (18)$$

$$\underline{\text{MAL}}.\text{MBL}.\text{MCL}.\text{MEL}.\underline{\text{MFL}}-\text{LA11} \qquad (19)$$

$$\underline{\text{MAL}}.\text{MBL}.\text{MCL}.\underline{\text{MEL}}.\underline{\text{MFL}}-\text{LA12} \qquad (20)$$

$$\text{MAL}.\text{MBL}.\text{MCL}.\text{MEL}.\underline{\text{MFL}}-\text{LA13} \qquad (21)$$

$$\text{MAL}.\text{MBL}.\text{MCL}.\underline{\text{MEL}}.\underline{\text{MFL}}-\text{LA14} \qquad (22)$$

$$\underline{\text{MAL}}.\underline{\text{MBL}}.\text{MDL}.\text{MEL}.\underline{\text{MFL}}-\text{LA15} \qquad (23)$$

$$\underline{\text{MAL}}.\underline{\text{MBL}}.\text{MDL}.\underline{\text{MEL}}.\underline{\text{MFL}}-\text{LA16} \qquad (24)$$

$$\text{MAL}.\text{MDL}.\text{MEL}.\underline{\text{MFL}}-\text{LA17} \qquad (25)$$

$$\text{MAL}.\text{MDL}.\underline{\text{MEL}}.\underline{\text{MFL}}-\text{LA18} \qquad (26)$$

$$\text{MBL}.\text{MDL}.\text{MEL}.\underline{\text{MFL}}-\text{LA19} \qquad (27)$$

$$\text{MBL}.\text{MDL}.\underline{\text{MEL}}.\underline{\text{MFL}}-\text{LA20} \qquad (28)$$

Four library tracks are used to accommodate the translations of 4-digit codes, and the appropriate pair of these may be selected by means of two relays only, relays MAL and MBL being used. In addition, relay MEL is employed to select the required one of the pair of tracks identified by the A-digit, the signal from the set output of relay MFL and the signal from the reset output of relay MGL being included in the selection circuits to confine the selection to the case of 4-digit codes. Four relays LB1–4 are used to switch the tracks containing translations of 4-digit codes, these relays being set by the four circuits:

$$\text{MAL}.\underline{\text{MBL}}.\text{MEL}.\text{MFL}.\underline{\text{MGL}}-\text{LB1} \qquad (29)$$

$$\text{MAL}.\underline{\text{MBL}}.\underline{\text{MEL}}.\text{MFL}.\underline{\text{MGL}}-\text{LB2} \qquad (30)$$

$$\underline{\text{MAL}}.\text{MBL}.\text{MEL}.\text{MFL}.\underline{\text{MGL}}-\text{LB3} \qquad (31)$$

and $$\underline{\text{MAL}}.\text{MBL}.\underline{\text{MEL}}.\text{MFL}.\underline{\text{MGL}}-\text{LB4} \qquad (32)$$

To select the appropriate one of the six library tracks containing translations for 5-digit codes, three of the A-digit registering relays MAL–MCL are employed, together with the B-digit relay MEL, and relay MGL. The tracks are switched by six relays LC1–6, which are set by the following circuits:

$$\text{MAL}.\text{MBL}.\text{MEL}.\text{MGL}-\text{LC1} \qquad (33)$$

$$\text{MAL}.\text{MBL}.\underline{\text{MEL}}.\text{MGL}-\text{LC2} \qquad (34)$$

$$\underline{\text{MAL}}.\text{MCL}.\text{MEL}.\text{MGL}-\text{LC3} \qquad (35)$$

$$\underline{\text{MAL}}.\text{MCL}.\underline{\text{MEL}}.\text{MGL}-\text{LC4} \qquad (36)$$

$$\text{MAL}.\text{MCL}.\text{MEL}.\text{MGL}-\text{LC5} \qquad (37)$$

$$\text{MAL}.\text{MCL}.\underline{\text{MEL}}.\text{MGL}-\text{LC6} \qquad (38)$$

*Address Track Switching Circuits*

The condition of relay MEL is also used in the address track switching circuit to determine whether the B-digit is odd or even, and hence to select address track SL1 or SL2 for use in conjunction with track SL3 to provide the address. The signal SLY is produced from the selected one of tracks SL1 and SL2, and is used in conjunction with certain timing pulses to provide the composite address signal. Signals SLY and $\underline{\text{SLY}}$ are derived from the circuits:

$$(\text{SL1.MEL})+(\text{SL2}.\underline{\text{MEL}})-\text{SLY} \qquad (39)$$

and $$(\underline{\text{SL1}}.\text{MEL})+(\underline{\text{SL2}}.\underline{\text{MEL}})-\underline{\text{SLY}} \qquad (40)$$

It will be seen from these circuits that with relay MEL in the set condition, a 1 on track SL1 produces the SLY signal, and a 0 on track SL1 produces the $\underline{\text{SLY}}$ signal, while with relay MEL in the reset condition, a 1 on track SL2 produces the SLY signal and a 0 on track SL2 produces the $\underline{\text{SLY}}$ signal.

The composite signal SLA, which is the address compared with the address digits circulating on the transfer track, is produced by the four circuits:

$$\underline{\text{MFL}}.(\text{TY6}+14+22+30)\text{SLY}-\text{SLA} \qquad (41)$$

$$\underline{\text{MFL}}.(\text{TY7}+15+23+31).\text{SL3}-\text{SLA} \qquad (42)$$

$$\underline{\text{MFL}}.(\text{TY6}+14+22+30).\underline{\text{SLY}}-\underline{\text{SLA}} \qquad (43)$$

and $$\underline{\text{MFL}}.(\text{TY7}+15+23+31).\underline{\text{SL3}}-\underline{\text{SLA}} \qquad (44)$$

It will be seen from these four circuits that address signals are only produced during the timing pulses corresponding with the scan of the B- and C-digit storage blocks on the transfer track, and that during the scan of the B-digit storage block the SLY signal produces a signal SLA and the $\underline{\text{SLY}}$ signal produces a signal $\underline{\text{LSA}}$, while during the scan of the C-digit storage block, a 1 read from the address track SL3 produces a signal SLA, and a 0 read from the address track SL3 produces a signal $\underline{\text{SLA}}$. The inclusion of the signal from the reset output of relay MFL ensures that these circuits are inoperable in the case of 4- and 5-digit codes.

For a 4-digit code, the address digits circulating on the transfer track, comprising the intermediate B-digit together with the dialled D-digit, are in storage blocks coinciding with timing pulses TY7 and TY8, TY15 and TY16, TY23 and TY24, and TY31 and TY32. The four circuits producing SLA and $\underline{\text{SLA}}$ signals for 4-digit codes require these timing pulses, and also the inclusion of the signal from the set output of relay MFL. The circuits are as follows:

$$\text{MFL}.\underline{\text{MGL}}.(\text{TY7}+15+23+31).\text{SLY}-\text{SLA} \qquad (45)$$

$$\text{MFL}.\underline{\text{MGL}}.(\text{TY8}+16+24+32).\text{SL3}-\text{SLA} \qquad (46)$$

$$\text{MFL}.\underline{\text{MGL}}.(\text{TY7}+15+23+31).\underline{\text{SLY}}-\underline{\text{SLA}} \qquad (47)$$

and $$\text{MFL}.\underline{\text{MGL}}.(\text{TY8}+16+24+32).\underline{\text{SL3}}-\underline{\text{SLA}} \qquad (48)$$

The signal from the reset output of relay MGL is included in these circuits to make them inoperable when a 5-digit code address is required.

Four further circuits are required for providing address signals in the case of 5-digit codes, the timing pulses being arranged to coincide with the scans of the second intermediate B-digit and the E-digit storage blocks respectively. The circuits are:

$$\text{MGL}.(\text{TY8}+16+24+32).\text{SLY}-\text{SLA} \qquad (49)$$

$$\text{MGL}.(\text{TY9}+17+25+1).\text{SL3}-\text{SLA} \qquad (50)$$

$$\text{MGL}.(\text{TY8}+16+24+32).\underline{\text{SLY}}-\underline{\text{SLA}} \qquad (51)$$

and $$\text{MGL}.(\text{TY9}+17+25+1).\underline{\text{SL3}}-\underline{\text{SLA}} \qquad (52)$$

*Checking Circuit for Common Register Equipment*

Since only the equipments individual to track circuits are checked by means of the markings alternately written and cancelled in the register section TZ1 of each track, it is also necessary to provide circuits for checking the common equipment, comprising the impulse registration, translation, transmission, and forced-release circuits, which are used for each completed call. For this purpose a further register section is made inaccessible to incoming calls, and artificial traffic is generated which uses this register and the common equipment in the same way as regular calls. It is convenient to use the first working register of the first register track, i.e. register TZ2.TW1, for this purpose, and no relay set is provided for this register.

The test of the common equipment is effected by seizing this test register, writing in the "initial digit" as described in connection with the impulse registration equipment, transmitting this digit from the register and feeding it back so as to simulate a dialled A-digit. A test is then made to ensure that the correct digit has been stored, and if it has, the digit 14 is written into each of the B-, C-, D- and E-digit storage blocks. These code digits are now translated as a 5-digit code, so that the translation equipment goes through the sequence of intermediate translations for a 3-digit code followed by a 4-digit expansion of it. A special translation is provided for this 5-digit code which comprises a meter digit and a transmission control digit only. The meter digit is transmitted and is returned to the register as the first numerical digit, and the transmission control digit determines that the first numerical is the next digit to be transmitted. After a test has been made to ensure that this digit has been stored correctly, it is transmitted and returned to the register as the second numerical digit. This is again checked to ensure that the correct digit is stored. The second numerical digit is transmitted, but is ineffective, the end of transmission of this digit resulting in a signal which clears the register. When the register has been cleared the sequence of operation is repeated.

The circuit will be described with reference to FIG. 9. A key-controlled signal PSR causes the three relays used in the testing circuit to assume the reset condition, these relays being MAR, MBR and MCR. This circuit is:

$$\mathrm{PSR}-\overline{\mathrm{MAR}},\overline{\mathrm{MBR}}\text{ and }\overline{\mathrm{MCR}} \qquad (1)$$

The checking cycle commences when a signal $\overline{\mathrm{PSR}}$ and a further signal $\overline{\mathrm{ALM}}$ are being generated. The first of these two signals is obtained from the normal condition of the PSR key-switch, and the second indicates that the drum mechanism is functioning correctly and that no alarm condition exists. When a register is in the idle condition, a signal LPOF is generated once during each scan, and this signal is used to set relay MAR during the scan of register TZ3.TW1 by means of the circuit:

$$\overline{\mathrm{PSR}}.\overline{\mathrm{ALM}}.\mathrm{LPOF.TZ3.TW1}-\mathrm{MAR} \qquad (2)$$

Relay MBR is set during the scan of the following register TZ3.TW5 by means of the circuit:

$$\mathrm{MAR.TZ3.TW5}-\mathrm{MBR} \qquad (3)$$

A test is made to determine whether relay MBR has been set, and this also checks the correct operation of relay MAR. This checking circuit is:

$$\mathrm{MAR}.\overline{\mathrm{MBR}}.\mathrm{TZ4.TW5}-\mathrm{POB} \qquad (4)$$

the fault signal POB being generated if relay MBR has not been set by the time register TZ4.TW5 is scanned.

When these two relays are both in the set condition, a signal IMP is generated by the circuit:

$$\mathrm{MAR.MBR}-\mathrm{IMP} \qquad (5)$$

the signal IMP being applied to the incoming scanner during the scan of register TZ2.TW1. This signal simulates the subscriber's looped line condition, which causes the register to be seized, in the manner described in connection with FIG. 5. The "initial digit" is written into the block TY4 of the test register by the previously-mentioned circuit:

$$\mathrm{MAB.IDM.TY4}-\mathrm{SBS} \qquad (5,\text{ FIG. }5)$$

of the common equipment, and is immediately transmitted. The impulses transmitted from this register via the outgoing scanning equipment are fed back into the same register by resetting relay MBR in the circuit:

$$\mathrm{MAR.LPOI.TZ3.TW1}-\overline{\mathrm{MBR}} \qquad (6)$$

the LPOI signal generated during the timing pulse TZ3.TW1 being initiated each time a 1 is subtracted from a digit being transmitted from register TZ2.TW1. Relay MBR is set by the previously-mentioned circuit:

$$\mathrm{MAR.TZ3.TW5}-\mathrm{MBR} \qquad (3)$$

during the scan of register TZ3.TW5, and its set condition is used to generate another impulse for the test register by means of the circuit:

$$\mathrm{MAR.MBR}-\mathrm{IMP} \qquad (5)$$

The three circuit (3), (5) and (6) operate in turn until the "initial digit" has been completely transmitted and registered as the A-digit.

At the end of the impulse train, a 1 is written in the incoming busy element of the A-digit storage block by means of the previously-mentioned circuit:

$$\mathrm{MEB}.\overline{\mathrm{MFB}}.\mathrm{TX1.(TY13-29)}-\mathrm{SBS} \qquad (22,\text{ FIG. }5)$$

and when this marking is detected, a relay MCR is set by the circuit:

$$\mathrm{MAR.SLS.TX1.TY13.TZ2.TW1}-\mathrm{MCR} \qquad (7)$$

The set condition of relay MCR is used to check that the markings in the A-digit storage block confirm to the "initial digit," the circuits used being:

$$\mathrm{MCR.SLS.IDM.TY13}-\mathrm{POB} \qquad (8)$$

and $$\mathrm{MCR}.\overline{\mathrm{SLS}}.\overline{\mathrm{IDM}}.\mathrm{TY13}-\mathrm{POB} \qquad (9)$$

The signal IDM, as previously-mentioned, represents the TX timing pulses required by the initial digit, and the signal $\overline{\mathrm{IDM}}$ is used to indicate the timing pulses required by the complement of the initial digit. It is not necessary to include the timing pulses representing the test register in these circuits because relay MCR is only set during the scan of element TX1.TY13 of the test register and is reset before the end of the scan of that register. The signal POB is an alarm signal indicating a fault on the common register equipment.

If the A-digit is found to have been correctly registered, the digit 14 is written in each of the B-, C-, D- and E-digit storage blocks by means of the circuit:

$$\mathrm{MCR.(TX4-6).(TY14-17)}-\mathrm{SBS} \qquad (10)$$

and the incoming busy marking is written in each of these storage blocks by means of the circuit:

$$\mathrm{MCR.TX1.(TY14-17)}-\mathrm{SBS} \qquad (11)$$

These circuits are prevented from operating during subsequent scans by resetting relay MCR when a 1 marking is detected in the incoming busy element of the B-digit storage block by the circuit:

$$\mathrm{MCR.SLS.TX1.TY14}-\overline{\mathrm{MCR}} \qquad (12)$$

Relay MCR is reset after being used to write in B-, C-, D- and E-digits by means of the circuit:

$$\mathrm{MCR.TX6.TY17}-\overline{\mathrm{MCR}} \qquad (13)$$

and a check is made during the scan of element TX1.TY18 of the register to determine that relay MCR has, in fact, been reset. The circuit used for this is:

$$\mathrm{MCR.TX1.TY18}-\mathrm{POB} \qquad (14)$$

The artificial code now stored in the test register undergoes translation in the manner previously described, search being made first for a 3-digit translation, then for a 4-digit expansion, and finally for a 5-digit expansion. The final translation, which is obtained from a section of the library not accessible to a calling subscriber, comprises a meter digit and a transmission control digit only. The digit 13 is used for the meter digit, stored in block TY5 of the appropriate library section, and the transmission control digit stored in block TY12 determines that transmission commences with the first numerical digit.

When these two translation digits are returned to the test register, the meter code is first transmitted and is received back into the register by means of the previously-mentioned circuits (3), (5) and (6), the digit being allocated to the first numerical digit storage block. When the digit has been completely registered and the incoming busy marking written in element TX1.TY18, the digit is again transmitted and is received back into the register, again using circuits (3), (5) and (6), the digit now being allocated to the second numerical digit storage block. Circuits are provided for determining that the incoming busy elements of the first and second numerical digit storage blocks are marked, and if so, that the correct markings are registered in these storage blocks to correspond to the digit 13. Relay MCR is set when the incoming busy marking is detected, by means of the circuit:

$$\text{MAR.SLS.TX1.(TY18+19).TZ2.TW1}-\text{MCR} \quad (15)$$

and the set condition of relay MCR is used to test that the correct digit is registered. The circuits used for this test are:

$$\text{MCR.SLS.TX4.(TY18+19)}-\text{POB} \quad (16)$$

and $$\text{MCR.}\underline{\text{SLS}}\text{.(TX3+5+6).(TY18}-\text{19)}-\text{POB} \quad (17)$$

After checking the first numerical digit storage block, relay MCR is reset by the circuit:

$$\text{MCR.}\underline{\text{SLS}}\text{.TX1.TY19}-\underline{\text{MCR}} \quad (18)$$

which is operative only when the incoming busy marking has not been written in the second numerical digit storage block. When the second numerical digit has been registered, this circuit is no longer operative, and relay MCR remains in the set condition after circuit (15) has been effective. The set condition of the relay is now used to write an incoming busy marking in the third and fourth numerical digit storage blocks by means of the circuit:

$$\text{MCR.TX1.(TY20+21)}-\text{SBS} \quad (19)$$

after which relay MCR is reset by means of the circuit:

$$\text{MCR.TX6.TY22}-\underline{\text{MCR}} \quad (20)$$

A further circuit is provided for ensuring that relay MCR has been reset during the timing pulse TX6.TY22, this circuit being:

$$\text{MCR.TX1.TY30}-\text{POB} \quad (21)$$

The transmission of the second numerical digit does not result in a further digit being stored in the test register because of the incoming busy markings written by circuit (19).

A signal LPOC is generated at the end of the transmission of the second numerical digit, and this is detected during the scan of register TZ3.TW1 and causes relay MAR to be reset, the circuit being:

$$\text{MAR.LPOC.TZ3.TW1}-\underline{\text{MAR}} \quad (22)$$

The test circuit is now in its original condition, and the test is repeated as soon as the LPOF signal is received indicating that the register has been cleared. If the LPOF signal is received during the test cycle, the set condition of relay MAR is used to initiate a fault signal in the circuit:

$$\text{MAR.LPOF.TZ3.TW1}-\text{POB} \quad (23)$$

*Testing Circuit for Library and Address Track Switching Circuits*

The 30 library tracks are tested in groups of four, the test being supervised by a binary counter comprising five relays, providing a count of 32. The test cycle is initiated at terminals of 500 ms., provided the transfer track is free. In each cycle the last two library tracks are tested twice to make up the count of 32.

At the beginning of the test cycle, the transfer track is seized and a 3-digit code is written on it by the testing circuit. The translation circuits are now brought into operation, the library track being selected by the combination of the A- and B-digits of the code, and the translation address being determined by the B- and C-digits. The translation selected provides a further code which is written on the transfer track, and in addition includes a digit which occupies the block normally used for the transmission control digit (TY12), and which should correspond with the setting of the binary counter. If this digit and the counter setting agree, the library track switching circuit is reset and the translation code stored on the transfer track is used to select a second translation. At the same time the binary counter is stepped forward one position, and its setting is checked against the TY12 digit of the new translation. If agreement is reached again between this digit and the counter setting, the new translation is again used to select a library address and the counter is stepped to the next position. The process is repeated until the fourth library track has been referred to, the test code translation of which contains no A-, B-, and C-digits, but contains a counter checking digit in block TY12 which is again compared with the counter setting. If agreement is again reached, the transfer track is released. At the commencement of the next 500 ms. period, the transfer track is seized as soon as it becomes free, and the binary counter is stepped to its next position, which is the fourth. In this position the counter causes a further 3-digit code to be written on the transfer track, and this initiates a test cycle for the next four library tracks. The process is repeated until all library tracks have been tested.

The circuit will be described with reference to FIG. 10. A key operation, designated PSR causes three relays MAP, MBP and MCP to be reset, and five relays MDP, MEP, MFP, MGP and MHP to be set, the circuit being:

$$\text{PSR.}-\underline{\text{MAP}}.\underline{\text{MBP}}.\underline{\text{MCP}}\text{.MDP.MEP.MFP.MGP and MHP} \quad (1)$$

The five relays MDP–MHP are used in the binary counter, the operational sequence for which will be given later. A sequence of clock signals TC1–5, each lasting 100 ms., and having a cycle time of 500 ms., is provided for controlling the test of the library track switching circuits.

If no alarm condition exists, which would be indicated by the signal ALM, when the start key is released a start signal PST is generated during clock pulse TC1 by means of the circuit:

$$\underline{\text{PSR}}.\underline{\text{ALM}}\text{.TC1}-\text{PST} \quad (2)$$

When the signal PST is present, the transfer track is tested, and if it is free, as indicated by a 0 marking in the busy element (TX1.TY5,TX1.TY13,TX1.TY21,TX1.TY29)

relay MAP is set by means of the circuit:

$$\text{PST.}\underline{\text{SLT}}.\underline{\text{MAP}}\text{.TX1.TY29}-\text{MAP} \quad (3)$$

and at the same time a busy marking is written in this element, by the circuit:

$$\text{PST.}\underline{\text{SLT}}.\underline{\text{MAP}}\text{.TX1.TY29}-\text{SBT} \quad (4)$$

The set condition of relay MAP is now used to step the binary counter, which with all relays in the set condition was registering a count of 31, to the zero condition during the timing pulse TX2.TY29. The circuit for this is:

$$\text{MAP.}\underline{\text{MCP}}\text{.TX2.TY29}-\text{BCD} \quad (5)$$

the signal BCD being the drive input to the binary counter. The reset condition of relay MCP is included in this circuit to confine its operation to the start of the test of each library track, because relay MAP will be set in readiness for the test of the next library track before the test of the first track is completed. The set condition of relay MAP is also used in circuits for resetting the library track switching circuits. Tracks 1–16 are reset by the circuit:

$$\text{MAP}.\underline{\text{MBP}}.\underline{\text{MHP}}-\text{LTR}(1\text{–}16) \qquad (6)$$

and tracks 17–20 are reset by the circuit:

$$\text{MAP}.\underline{\text{MBP}}.\underline{\text{MFP}}.\underline{\text{MGP}}.\text{MHP}-\text{LTR}(17\text{–}20) \qquad 7)$$

The reset condition of relay MBP is included in these circuits to prevent further resetting signals being generated on subsequent scans, relay MBP being set by one of the circuits:

$$\text{MAP}.\underline{\text{MCP}}.\underline{\text{MHP}}-\text{MBP} \qquad (8)$$

operative during the test of tracks 1–16, or $$\text{MAP}.\underline{\text{MCP}}.\underline{\text{MFP}}.\underline{\text{MGP}}.\text{MHP}-\text{MBP} \qquad (9)$$

during the test of tracks 17–20. It will be seen when the operation of the binary counter is described later that relay MHP is in the reset condition during the test of library tracks 1–16 and is set during the test of tracks 17–30.

For library tracks containing translations of 4-digit codes, the LTR signal and the setting of relay MBP are confined to the periods when the binary counter is in one of the conditions appropriate to the test of library tracks 21–24, the coincidence required being:

$$\text{MAP}.\underline{\text{MBP}}.\text{MFP}.\underline{\text{MGP}}.\text{MHP}.\text{TY16}-\text{LTR}(21\text{–}24) \qquad (10)$$

and $$\text{MAP}.\text{MFP}.\underline{\text{MGP}}.\text{MHP}.\text{TX}.\text{TY16}-\text{MBP} \qquad (11)$$

Similar arrangements are used for resetting the switching circuits of the library tracks used for translations of 5-digit codes, i.e. tracks 25–30, the circuits required for producing the signal LTR and for setting relay MBP in this case being:

$$\text{MAP}.\underline{\text{MBP}}.\text{MGP}.\text{MHP}.\text{TY17}-\text{LTR}(25\text{–}30) \qquad (12)$$

and $$\text{MAP}.\text{MGP}.\text{MHP}.\text{TX6}.\text{TY17}-\text{MBP} \qquad (13)$$

In the circuits for resetting the switching circuits for library tracks relating to 4-digit codes, the timing pulse TL16 is included, the timing of signal LTR in this case providing an indication that a 4-digit code is being translated. The inclusion of the timing pulse TY17 in the case of the reset signal for the switching circuits of library tracks 25–30 serves a similar purpose in indicating that a 5-digit code is to be translated.

When all the relays of the binary counter are simultaneously reset upon the change from the 31 to the zero condition resulting from the operation of circuit (5), a signal PBA is initiated by the circuit:

$$\underline{\text{MDP}}.\underline{\text{MEP}}.\underline{\text{MFP}}.\underline{\text{MGP}}.\underline{\text{MHP}}-\text{PBA} \qquad (14)$$

This signal is used to write an artificial A-digit on the transfer track, the digit 1 being used, so that the first pair of library tracks is selected. The A-digit writing circuit is:

$$\text{MAP}.\text{PBA}.\text{TX3}.\text{TY29}-\text{SBT} \qquad (15)$$

Further circuits are provided for writing artificial B- and C-digits on the transfer track, the digits chosen being 11 and 12 respectively. These B- and C-digits are also used in the case of tracks 5, 9, 13, 17, 21, 25 and 29, but the following two circuits are employed for tracks 1, 5, 9 and 13 only because of the different conditions of the binary counter relays during the test of later library tracks. The two circuits are:

$$\text{MAP}.\underline{\text{MDP}}.\underline{\text{MEP}}.\underline{\text{MHP}}.(\text{TX3}+4+6).\text{TY30}-\text{SBT} \qquad (16)$$

and $$\text{MAP}.\underline{\text{MDP}}.\underline{\text{MEP}}.\underline{\text{MHP}}.(\text{TX5}+6).\text{TY31}-\text{SBT} \qquad (17)$$

The required library track is now selected from the artificial A- and B-digits circulating on the transfer track storage block on the transfer track is also inoperable.

in blocks TY5 and TY6. The selection is made dependent upon the set condition of relay MBP to ensure that the switching circuits do not operate until after all the library track switching circuits have been reset. The selection circuit is:

$$\text{MAP}.\text{MBP}.\text{SLT}.(\text{TY5}-11)-\text{LTS} \qquad (18)$$

When the switching equipment has been set to select the required library track, relay MAP is reset by the circuit:

$$\text{MAP}.\text{MBP}.\text{TX6}.\text{TY11}-\underline{\text{MAP}} \qquad (19)$$

to prevent further operation of the foregoing circuits until the next TC clock pulse is generated.

The address track switching circuits are operated as described for the normal translation process, and the address digits circulating on the transfer track are compared with the signals read from the address tracks as previously-described until coincidence occurs, at which instant the signal LTT is generated. The translation of the circulating code is written on to the transfer track, cancelling the code digits previously written there. The translation contains a further A-, B- and C-digit, for which a translation may be obtained from the next library track to be tested, and also a counter checking digit in block TY12.

The signal LTT obtained from the previously-described circuit:

$$\text{MCC}.\text{TX6}.(\text{TY4}+12+20+28)-\text{LTT} \quad (19,\ \text{FIG. }6)$$

is used in a circuit to set relay MCP:

$$\text{LTT}.\text{MBP}-\text{MCP} \qquad (20)$$

It will be noted that the signal LTT appears immediately before the scan of the required translation block, so that relay MCP is set when the counter checking digit is read from the library. The circuits for comparing the counter checking digit with the setting of the binary counter will be described later. If no alarm signal has been given when the comparison between the counter checking digit and the setting of the counter has been made, relay MAP is reset by the circuit:

$$\text{MCP}.\text{MBP}.\underline{\text{ALM}}-\text{MAP} \qquad (21)$$

in time for the test of the next library track.

Relay MCP is reset at the end of the scan of the translation block from which the translation has been extracted, by means of the circuit:

$$\text{MBP}.\text{MCP}.\text{TX6}(\text{TY4}+12+20+28)-\underline{\text{MCP}} \qquad (22)$$

and at the same time relay MBP is reset by means of the circuit:

$$\text{MCP}.\text{TX6}.(\text{TY4}+12+20+28)-\underline{\text{MBP}} \qquad (23)$$

With relay MAP in the set condition and relay MCP reset, a further driving pulse is applied to the binary counter by means of the previously-mentioned circuit:

$$\text{MAP}.\underline{\text{MCP}}.\text{TX2}.\text{TY29}-\text{BCD} \qquad (5)$$

and the counter is stepped to the 1" position. It will be seen from the foregoing circuits that the artificial code is written on to the transfer track immediately the latter has been seized at the beginning of the test cycle for the first four library tracks. Since the translation address must be found within one revolution of the drum, the test of the first library track is completed within the time of one scanning cycle, i.e. 100 ms., and the second drive pulse to the binary counter is generated 100 ms. after the first driving pulse.

With relay MAP set and relay MBP reset by circuits (21) and (23) respectively, the resetting circuits for the library track switching circuits, (6) and (7), and the circuits (8) and (9) for setting relay MBP, now operate again. The previously-mentioned signal PBA is not generated for the test of the second library track because the circuit used to produce this signal, (14), is operable only when the binary counter is in the zero position, and circuit (15), which previously wrote a 1 in the A-digit Similarly the B- and C-digit circuits (16) and (17) are inhibited by the set condition of relay MDP when the binary counter is in the "1" position. The translation received from the library during the test of the first library track therefore remains unaltered, and the second library track is selected by the previously-mentioned circuit:

$$MAP.MBP.SLT.(TY5-11)-LTS \qquad (18)$$

in accordance with the new A- and B-digits, now on the transfer track. With relay MBP in the set condition due to the operation of circuits (8) and (9), relay MAP is reset by the previously-mentioned circuit:

$$MAP.MBP.TX6.TY11-\underline{MAP} \qquad (19)$$

The circulating B- and C-digits are compared with the address tracks until coincidence occurs, when the signal LTT is again generated, and causes relay MCP to be set by the previously-mentioned circuit:

$$LTT.MBP-MCP \qquad (20)$$

and the new translation is written on to the transfer track in place of the digits previously written there. The set condition of relay MCP again enables the counter checking digit to be compared with the setting of the binary counter, and if no alarm signal has been given when this comparison has been made, relay MAP is again reset by the circuit:

$$MCP.MBP.\underline{ALM}-MAP \qquad (21)$$

Relays MCP and MBP are then reset by means of the previously-mentioned circuits (22) and (23). The cycle is repeated for the third library track to be tested, when the binary counter is in position "2." In this position relay MDP is reset and relay MEP is set, so that circuits (16) and (17) are again inoperative, the translation received from the second library track being used to select an address on the third library track.

The same sequence is repeated for the test of the fourth library track, which is the last to be tested in the first group, and the circuits operate as previously described until the LTT signal is produced from the translation circuits. In this test both relays MDP and MEP in the binary counter are in the set condition, the counter being in position "3," and this again prevents the artificial code used for the test of the first library track being written on the transfer track. The set condition of relays MDP and MEP are used in coincidence with the LTT signal to reset relay MBP as soon as the correct address has been found, the circuit being:

$$LTT.\underline{MAP}.MDP.MEP-\underline{MBP} \qquad (24)$$

The use of the set conditions of relays MDP and MEP confines the operation of this circuit to every fourth position of the counter, i.e. to the test of the last library track in each group of four. The resetting of relay MBP after relay MCP has been set causes the transfer track to be cancelled by circuit:

$$\underline{MBP}.MCP-SAT \qquad (25)$$

It should be noted that the transfer track will not immediately be cleared, because the translation read from the library following the occurrence of the signal LTT will take precedence over the 0 signals generated by circuit (25). Relay MCP will not, however, be reset by the previously-mentioned circuit:

$$MCP.MBP.TX6(TY4+12+20+28)-\underline{MCP} \qquad (22)$$

because of the reset condition of relay MBP, so that the transfer track can be cleared on its next scan. When it has been cleared by circuit (25), relay MCP is reset by the circuit:

$$\underline{MBP}.MCP.\underline{SLT}.TX1.TY29-\underline{MCP} \qquad (26)$$

The reset condition of relay MBP resulting from the operation of circuit (24) prevents the setting of relay MAP by circuit (21), so that the transfer track is not seized on the following scan.

The next group of four library tracks is tested when the next TC1 pulse occurs and sets relay MAP by means of the signal PST as the transfer track becomes free. At this time the binary counter is in the "3" position, and is stepped to the "4" position when relay MAP has been set. In this position, the state of the counter relays is:

$$\underline{MDP}.\underline{MEP}.MFP.\underline{MGP}.\underline{MHP}$$

and this coincidence is used to produce a signal PBB by means of the circuit:

$$\underline{MDP}.\underline{MEP}.MFP.\underline{MGP}.\underline{MHP}-PBB \qquad (27)$$

Signal PBB is used to write an artificial A-digit on the transfer track, and since it is the fifth library track which is to be tested, the third pair of library tracks must be selected, for which the A-digit is 3. The A-digit writing circuit is:

$$MAP.PBB.(TX3+4).TY29-SBT \qquad (28)$$

In position "4" of the binary counter, both relays MDP and MEP are in the reset condition, so that circuits (16) and (17) are both operative, and write in the digits 11 and 12 on the transfer track as the B- and C-digits respectively. This new code is circulated and translated, and the testing cycle proceeds as previously described for the first four library tracks until the eighth library track is reached.

Further tests are made of successive groups of four library tracks on subsequent occurrences of the clock pulse TC1, a further artificial A-digit being provided during the test of the first library track in each group of four. During the test of library track 9, a signal PBC is produced by the binary counter in position "8" by means of the circuit:

$$\underline{MDP}.\underline{MEP}.\underline{MFP}.MGP.\underline{MHP}-PBC \qquad (29)$$

and the PBC signal is used in a circuit which writes the digit 5 as the new A-digit on the transfer track, this circuit being:

$$MAP.PBC.(TX3+5).TY29-SBT \qquad (30)$$

During the test of library track 13, a signal PBD is obtained from the binary counter in position 12 by means of the circuit:

$$\underline{MDP}.\underline{MEP}.MFP.MGP.\underline{MHP}-PBD \qquad (31)$$

this signal being used in a circuit which writes 7 as the new A-digit on the transfer track. This circuit is:

$$MAP.PBD.(TX3+4+5).TY29-SBT \qquad (32)$$

During the test of library track 17, a signal PBE is obtained from the binary counter in position 16, by means of the circuit:

$$\underline{MDP}.\underline{MEP}.\underline{MFP}.\underline{MGP}.MHP-PBE \qquad (33)$$

this signal being used in a circuit which writes 9 as the new A-digit on the transfer track. This circuit is:

$$MAP.PBE.(TX3+6).TY29-SBT \qquad (34)$$

It will be recalled that circuits (16) and (17) are only operable during the test of library tracks 1, 5, 9 and 13, and two further circuits are provided for writing in the B- and C-digits on the transfer track during the test of library track 17. These circuits are dependent on the signal PBE, and again produce the digits 11 and 12 respectively for the B- and C-digits. The two circuits are:

$$MAP.PBE.(TX3+4+6).TY30-SBT \qquad (35)$$

and $$MAP.PBE.(TX5+6).TY31-SBT \qquad (36)$$

The test of library track 20 completes the test of library tracks containing translations of 3-digit codes.

A further group of circuits is used for writing A-, C- and D-digits on the transfer track for testing the library tracks 21–30 containing translations of 4- and 5-digit codes. A signal PBF is generated by the binary counter when it has reached position 20, by means of the circuit:

$\overline{MDP}$.$\overline{MEP}$.MFP.$\overline{MGP}$.MHP—PBF (37)

The signal PBF is used in three circuits which write the digits 1, 11 and 12 in the A-, C- and D-digit storage blocks respectively on the transfer track. These circuits are:

MAP.PBF.TX3.TY29—SBT (38)

MAP.PBF.(TX3+4+6).TY31—SBT (39)

and

MAP.PBF.(TX5+6).TY32—SBT (40)

When the four tracks containing translations of 4-digit codes have been tested, the binary counter is stepped to position 24 and generates a signal PBG by means of the circuit:

$\overline{MDP}$.$\overline{MEP}$.$\overline{MFP}$.MGP.MHP—PBG (41)

The signal PBG is used in the test of library tracks 25–28 containing translations of 5-digit codes, when the digits 3, 11 and 12 are written as the A-, D- and E-digits respectively on the transfer track by means of the three circuits:

MAP.PBG.(TX3+4).TY29—SBT (42)

MAP.PBG.(TX3+4+6).TY32—SBT (43)

and

MAP.PBG.(TX5+6).TY1—SBT (44)

It was previously-mentioned that since the binary counter has 32 positions and there are only 30 library tracks to be tested, the last two tracks 29 and 30 are tested twice. A signal PBH is generated when the binary counter is in position 28 by means of the circuit:

$\overline{MDP}$.$\overline{MEP}$.MFP.MGP.MHP—PBH (45)

and this signal is used in three circuits which write the digits 5, 11 and 12 as the A-, D- and E-digits respectively on the transfer track. These circuits are:

MAP.PBH.(TX3+5).TY29—SBT (46)

MAP.PBH.(TX3+4+6).TY32—SBT (47)

and

MAP.PBH.(TX5+6).TY1—SBT. (48)

When the last library track has been tested, the binary counter will be in position 31, and the testing cycle is repeated when the next TC1 signal occurs.

The condition of the five relays used in the binary counter in the various positions of the counter are shown in the following table:

| Counter position: | Condition of relays |
|---|---|
| 0 | $\overline{MDP}$.$\overline{MEP}$.$\overline{MFP}$.$\overline{MGP}$.$\overline{MHP}$ |
| 1 | MDP.$\overline{MEP}$.$\overline{MFP}$.$\overline{MGP}$.$\overline{MHP}$ |
| 2 | $\overline{MDP}$.MEP.$\overline{MFP}$.$\overline{MGP}$.$\overline{MHP}$ |
| 3 | MDP.MEP.$\overline{MFP}$.$\overline{MGP}$.$\overline{MHP}$ |
| 4 | $\overline{MDP}$.$\overline{MEP}$.MFP.$\overline{MGP}$.$\overline{MHP}$ |
| 5 | MDP.$\overline{MEP}$.MFP.$\overline{MGP}$.$\overline{MHP}$ |
| 6 | $\overline{MDP}$.MEP.MFP.$\overline{MGP}$.$\overline{MHP}$ |
| 7 | MDP.MEP.MFP.$\overline{MGP}$.$\overline{MHP}$ |
| 8 | $\overline{MDP}$.$\overline{MEP}$.$\overline{MFP}$.MGP.$\overline{MHP}$ |
| 9 | MDP.$\overline{MEP}$.$\overline{MFP}$.MGP.$\overline{MHP}$ |
| 10 | $\overline{MDP}$.MEP.$\overline{MFP}$.MGP.$\overline{MHP}$ |
| 11 | MDP.MEP.$\overline{MFP}$.MGP.$\overline{MHP}$ |
| 12 | $\overline{MDP}$.$\overline{MEP}$.MFP.MGP.$\overline{MHP}$ |
| 13 | MDP.$\overline{MEP}$.MFP.MGP.$\overline{MHP}$ |
| 14 | $\overline{MDP}$.MEP.MFP.MGP.$\overline{MHP}$ |
| 15 | MDP.MEP.MFP.MGP.$\overline{MHP}$ |
| 16 | $\overline{MDP}$.$\overline{MEP}$.$\overline{MFP}$.$\overline{MGP}$.MHP |
| 17 | MDP.$\overline{MEP}$.$\overline{MFP}$.$\overline{MGP}$.MHP |
| 18 | $\overline{MDP}$.MEP.$\overline{MFP}$.$\overline{MGP}$.MHP |
| 19 | MDP.MEP.$\overline{MFP}$.$\overline{MGP}$.MHP |
| 20 | $\overline{MDP}$.$\overline{MEP}$.MFP.$\overline{MGP}$.MHP |
| 21 | MDP.$\overline{MEP}$.MFP.$\overline{MGP}$.MHP |
| 22 | $\overline{MDP}$.MEP.MFP.$\overline{MGP}$.MHP |
| 23 | MDP.MEP.MFP.$\overline{MGP}$.MHP |
| 24 | $\overline{MDP}$.$\overline{MEP}$.$\overline{MFP}$.MGP.MHP |
| 25 | MDP.$\overline{MEP}$.$\overline{MFP}$.MGP.MHP |
| 26 | $\overline{MDP}$.MEP.$\overline{MFP}$.MGP.MHP |
| 27 | MDP.MEP.$\overline{MFP}$.MGP.MHP |
| 28 | $\overline{MDP}$.$\overline{MEP}$.MFP.MGP.MHP |
| 29 | MDP.$\overline{MEP}$.MFP.MGP.MHP |
| 30 | $\overline{MDP}$.MEP.MFP.MGP.MHP |
| 31 | MDP.MEP.MFP.MGP.MHP |

The counter is stepped from stage to stage by the following circuits:

BCD.$\overline{MDP}$—MDP (49)

BCD.MDP—$\overline{MDP}$ (50)

BCD.MDP.$\overline{MEP}$—MEP (51)

BCD.MDP.MEP—$\overline{MEP}$ (52)

BCD.MDP.MEP.$\overline{MFP}$—MFP (53)

BCD.MDP.MEP.MFP—$\overline{MFP}$ (54)

BCD.MDP.MEP.MFP.$\overline{MGP}$—MGP (55)

BCD.MDP.MEP.MFP.MGP—$\overline{MGP}$ (56)

BCD.MDP.MEP.MFP.MGP.$\overline{MHP}$—MHP (57)

BCD.MDP.MEP.MFP.MGP.MHP—$\overline{MHP}$ (58)

The circuits for comparing the counter checking digit written in block TY12 of the transfer track with the setting of the binary counter will be described briefly. The checking digits are stored in elements TX2—6 of block TY12, and it is arranged that the 1 or 0 marking in each of these elements checks the set or reset condition of one of the five relays MDP–MHP of the binary counter. Thus in position 10 of the counter, for example, in which relays MDP, MFP and MHP are in the reset condition and relays MEP and MGP are in the set condition, the corresponding markings in the counter checking digit block will be a 0 in elements TX2, TX4 and TX6, and a 1 in elements TX3 and TX5. A series of circuits is provided which tests the correspondence of the markings in blocks TY12 of the transfer track with the setting of relays MDP–MHP, when relay MCP has been set at the instant when the correct address has been found by the circulating code. Element TX1.TY12 is always marked with a 1, and a circuit is provided to give an alarm if a 0 is detected in this element, the circuit being:

$\overline{SLL}$.MCP.TX1.(TY4+12+20+28)—POA (59)

Five circuits are provided for ensuring that a 0 appearing in the elements TX2—6 of block TY12 correspond to the reset conditions of the respective relays, MDP–MHP, and a further five circuits are provided for checking that a 1 in these elements corresponds to the set condition of the respective relays. The ten circuits are:

$\overline{SLL}$.MCP.MDP.TX2.(TY4+12+20+28)—POA (60)

$\overline{SLL}$.MCP.MEP.TX3.(TY4+12+20+28)—POA (61)

$\overline{SLL}$.MCP.MFP.TX4.(TY4+12+20+28)—POA (62)

$\overline{SLL}$.MCP.MGP.TX5.(TY4+12+20+28)—POA (63)

$\overline{SLL}$.MCP.MHP.TX6.(TY4+12+20+28)—POA (64)

SLL.MCP.$\overline{MDP}$.TX2.(TY4+12+20+28)—POA (65)

SLL.MCP.$\overline{MEP}$.TX3.(TY4+12+20+28)—POA (66)

SLL.MCP.$\overline{MFP}$.TX4.(TY4+12+20+28)—POA (67)

SLL.MCP.$\overline{MGP}$.TX5.(TY4+12+20+28)—POA (68)

and

SLL.MCP.$\overline{MHP}$.TX6.(TY4+12+20+28)—POA (69)

We claim:

1. In a registering and translating device for a telephone system, a magnetic drum, a plurality of circumferential tracks on said drum, a plurality of groups of storage blocks on each of said tracks, means responsive to the reception by said device of different numbers of exchange code digits for registering said digits in first storage blocks of one of said groups of storage blocks, means responsive to the registration of a predetermined number of exchange code digits for obtaining first translated digits as determined by the values of said predetermined number of exchange code digits and for registering said first translated digits in second storage blocks of said one group of storage blocks and means responsive if the number of exchange code digits registered in said first storage blocks exceeds said predetermined number for obtaining second translated digits as determined by the values of said first translated digits and the exchange code digit next registered after said predetermined number of exchange code digits and for registering said second translated digits in said second storage blocks.

2. In a registering and translating device for a telephone system, a magnetic drum, a plurality of circumferential tracks on said drum, a plurality of groups of storage blocks on each of said tracks, means responsive to the reception by said device of different numbers of exchange code digits for registering said digits in first storage blocks of one of said groups of storage blocks, means responsive to the registration of a predetermined number of exchange code digits for obtaining first translated digits as determined by the values of said predetermined number of exchange code digits and for registering said first translated digits in second storage blocks of said one group of storage blocks and means responsive if the number of exchange code digits registered in said first storage blocks exceeds said predetermined number for obtaining second translated digits as determined by the values of said first translated digits and the one exchange code digit next registered after said predetermined number and for registering said second translated digits in said second storage blocks and for obtaining third translated digits as determined by the values of said second translated digits and the exchange code digit next registered after said one exchange code digit and for registering said third translated digits in said second storage blocks.

3. In a registering and translating device for a telephone system, a magnetic drum, a plurality of circumferential tracks on said drum, a plurality of groups of storage blocks on each of said tracks, means responsive to the reception by said device of different numbers of exchange code digits for registering said digits in first storage blocks of one of said groups of storage blocks, means responsive to the registration of a predetermined number of exchange code digits for obtaining first translated digits as determined by the values of said predetermined number of exchange code digits and if the total number of exchange code digits received is equal to said predetermined number for registering said first translated digits in consecutive order in second storage blocks of said one group of storage blocks and if the total number of exchange code digits received is greater than said predetermined number for registering said first translated digits in non-consecutive order in said second storage blocks and means responsive to the registration of said first translated digits in non-consecutive order in said second storage blocks for registering the exchange code digit next registered after said predetermined number of exchange code digits in one of said second storage blocks and for obtaining second translated digits as determined by the values of said first translated digits and said one exchange code digit and for registering said second translated digits in said second storage blocks.

4. In a registering and translating device for a telephone system, a magnetic drum, a plurality of circumferential tracks on said drum, a plurality of groups of storage blocks on each of said tracks, means responsive to the reception by said device of different numbers of exchange code digits for registering said digits in first storage blocks of one of said groups of storage blocks, means responsive to the registration of a predetermined number of exchange code digits for obtaining first translated digits as determined by the values of said predetermined number of exchange code digits and if the total number of exchange code digits received is equal to said predetermined number for registering said first translated digits in consecutive order in second storage blocks of said one group of storage blocks and if the total number of exchange code digits received is greater than said predetermined number for registering the first of said translated digits in the first one of said second storage blocks and the second of said translated digits in the third one of said second storage blocks, means responsive to the registration of said first and second translated digits in said first and third ones of said second storage blocks for registering the one exchange code digit next registered in said first storage blocks after said predetermined number of exchange code digits in the fourth one of said second storage blocks, means for obtaining second translated digits as determined by the values of said first translated digits and said one exchange code digit and if the total number of exchange code digits is one more than said predetermined number for registering said second translated digits in consecutive order in said second storage blocks and if the total number of exchange code digits is two more than said predetermined number for registering the first of said second translated digits in the first one of said second storage blocks and the second one of said second translated digits in the fourth one of said second storage blocks, means responsive to the registration of said first and second digits of said second translated digits in said first and fourth storage blocks for registering the second exchange code digit registered in said first storage blocks after said predetermined number of exchange code digits in the fifth one of said second storage blocks and means for obtaining third translated digits as determined by the values of said second translated digits and said second exchange code digit and for registering said third translated digits in consecutive order in said second storage blocks.

5. In a registering and translating device for telephone systems, a magnetic drum, a plurality of circumferential tracks on said drum, a plurality of groups of storage blocks on each of said tracks, means responsive to the reception by said device of different numbers of exchange code digits for registering said digits in first storage blocks of one of said groups of storage blocks, means for discriminating between different numbers of exchange code digits, means responsive to the operation of said discriminating means when the number of exchange code digits is equal to a predetermined number for effecting one translating operation and for registering the translated digits in second storage blocks in said one group of storage blocks, means responsive to the operation of said discriminating means when the number of exchange code digits is greater by one than said predetermined number for effecting two translating operations and for registering the final translated digits in said second storage blocks and means responsive to the operation of said discriminating means when the number of exchange code digits is greater by two than said predetermined number for effecting three translating operations and for registering the final translated digits in said second storage blocks.

6. In a registering and translating device for telephone systems, a magnetic drum, a plurality of circumferential register tracks on said drum, a plurality of groups of storage blocks on each of said register tracks, means responsive to the reception by said device of a plurality of exchange code digits for registering said digits in first storage blocks of one of said groups of storage blocks, first, second and third circumferential address tracks on said drum, the first of said address tracks bearing permanent registrations representing all odd digits, the second of said address tracks bearing permanent registrations representing all even digits and the third of said address tracks bearing permanent registrations representing all digit values, a plurality of circumferential library tracks on said drum arranged in pairs and bearing permanent registrations representing translations of said exchange code digits, means for selecting a pair of library tracks in accordance with the value of one of said code digits, means for selecting one library track of a pair of selected library tracks and for selecting one of said first and second address tracks in accordance with the odd and even value of a second of said exchange code digits, means for comparing said second exchange code digit and a third of said exchange code digits registered in said first storage blocks with the permanent registrations on the selected one of said first and second address tracks and on said third address track and means responsive to coincidence being attained in said comparing means for transferring the corresponding translation from the selected library track to further storage blocks in said one group of storage blocks.

7. In a registering and translating device as claimed in claim 6 each address track comprises a plurality of groups of storage blocks, a different digit being registered on each successive group of storage blocks on said third address track while the same odd digit is repeatedly registered on the first address track and the same even digit is repeatedly registered on the second address track for the whole sequence of digits registered on said third address track.

References Cited in the file of this patent

UNITED STATES PATENTS

| | | |
|---|---|---|
| 2,680,155 | Molnar | June 1, 1954 |
| 2,716,159 | Flowers | Aug. 23, 1955 |
| 2,723,311 | Malthaner et al. | Nov. 8, 1955 |
| 2,897,281 | Flood et al. | July 28, 1959 |
| 2,897,282 | Hopkins | July 28, 1959 |
| 2,932,695 | Gohorel | Apr. 20, 1960 |

FOREIGN PATENTS

| | | |
|---|---|---|
| 717,687 | Great Britain | Nov. 8, 1954 |